US006625398B1

(12) United States Patent
Nonaka

(10) Patent No.: US 6,625,398 B1
(45) Date of Patent: Sep. 23, 2003

(54) CAMERA WITH A MULTI-POINT DISTANCE MEASURING APPARATUS

(75) Inventor: Osamu Nonaka, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 101 days.

(21) Appl. No.: 09/656,981

(22) Filed: Sep. 7, 2000

(30) Foreign Application Priority Data

Sep. 10, 1999 (JP) .......................................... 11-257405

(51) Int. Cl.[7] .............................. G03B 3/10; G03B 7/08; G03B 17/00
(52) U.S. Cl. ........................ 396/121; 396/234; 396/50
(58) Field of Search ........................... 396/89, 96, 100, 396/104, 121, 122, 123, 124, 50, 233, 234

(56) References Cited

U.S. PATENT DOCUMENTS 5,144,358 A * 9/1992 Tsura et al. .................... 396/50
5,241,167 A * 8/1993 Suzuki et al. ............. 250/201.8

FOREIGN PATENT DOCUMENTS

JP          10-142490        5/1998

* cited by examiner

*Primary Examiner*—Russell Adams
*Assistant Examiner*—Arthur A Smith
(74) *Attorney, Agent, or Firm*—Frishauf, Holtz, Goodman & Chick, P.C.

(57) ABSTRACT

The present invention provides the position detector (line sensors) for outputting the information concerning the position of each distance measuring point within a picture to be taken by a camera, the multi-point photometer (correlation computer and integral controller) for outputting the incident light luminance information of each distance measuring point and the priority determiner (selector) for determining the priority of the distance measuring point according to the information concerning the position and incident light information of each distance measuring point within a picture, and is capable of executing the integral control of all the distance measuring points within a picture, determining the priority of the distance measuring point according to the luminance distribution within the picture and executing the interpolation computation for only the distance measuring points within the predetermined range of distance. Thus, the present invention provides a multi-point distance measuring camera designed for enabling a high-speed focusing based on the measured distances of a few number of distance measuring points by omitting the distance measuring operations for those distance measuring points having low priorities.

22 Claims, 16 Drawing Sheets

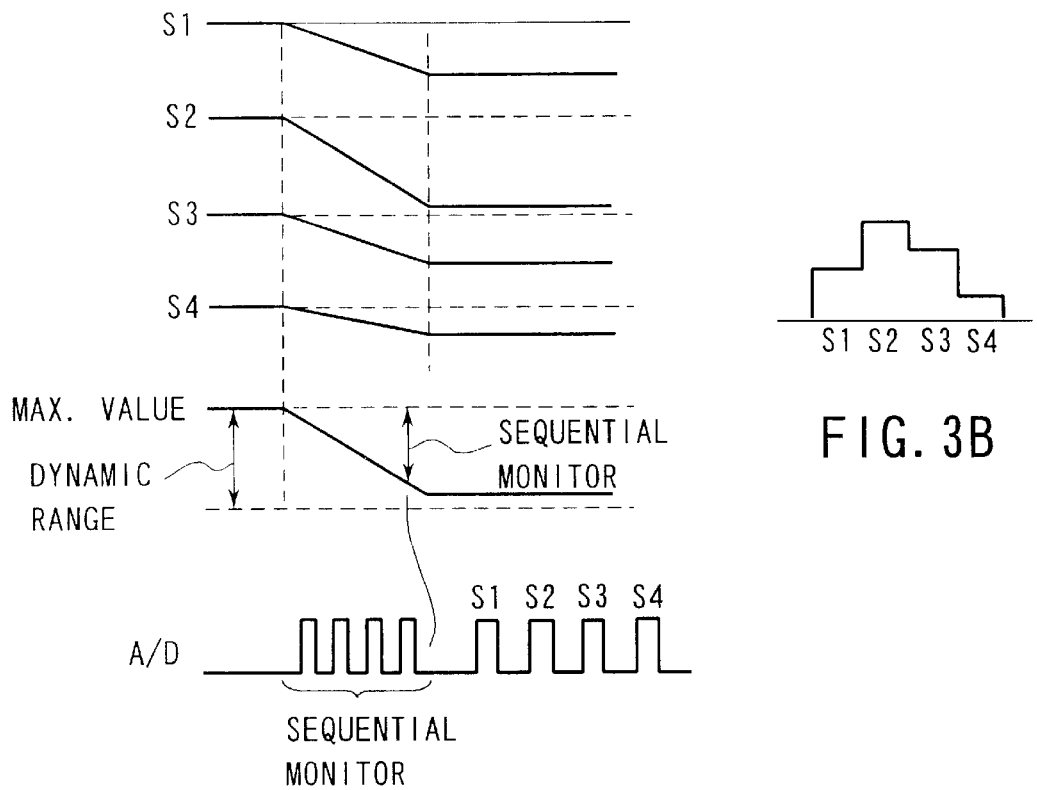
FIG. 3B
FIG. 3A
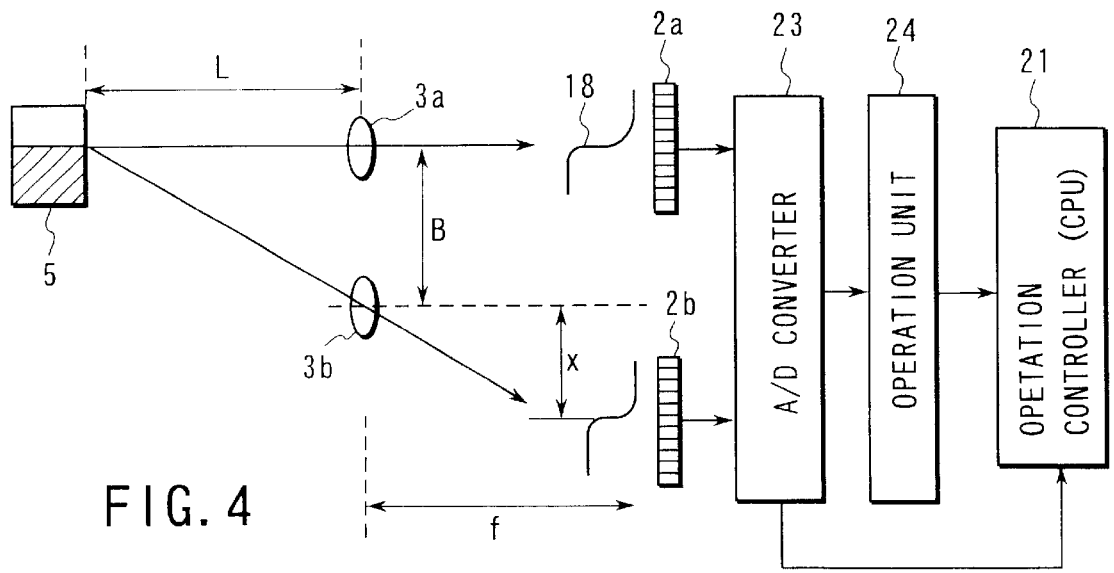
FIG. 4

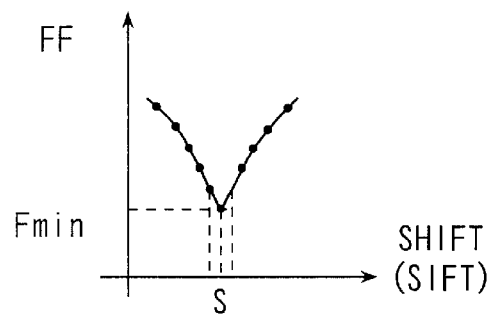
FIG. 5A
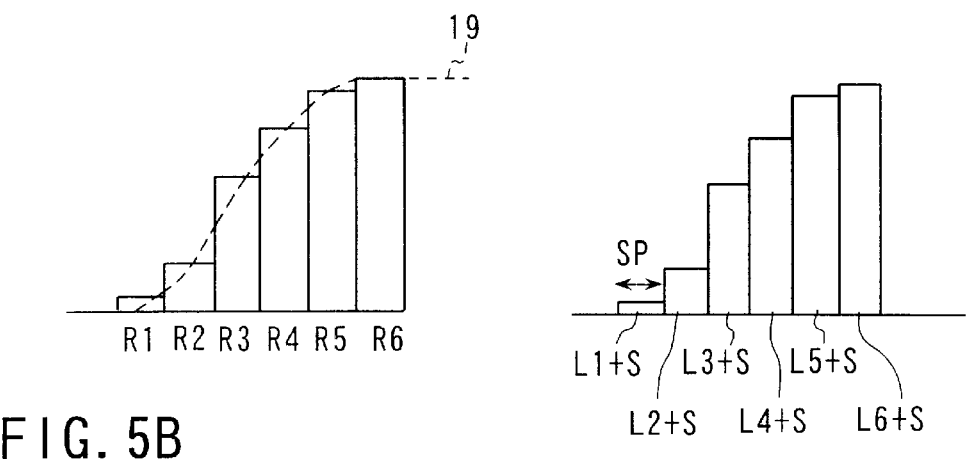
FIG. 5B
FIG. 5C
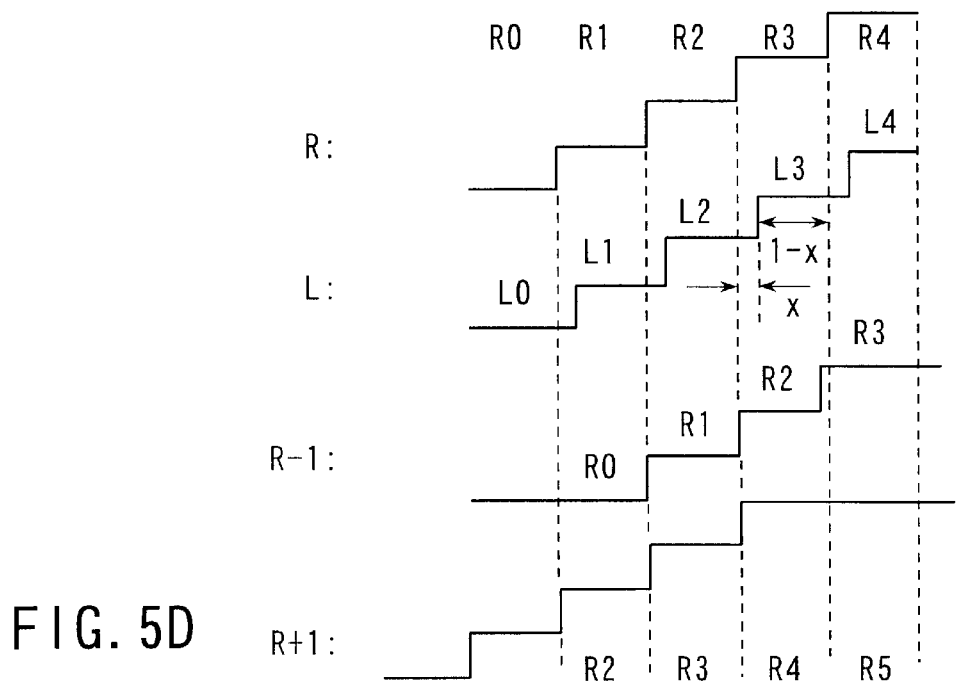
FIG. 5D

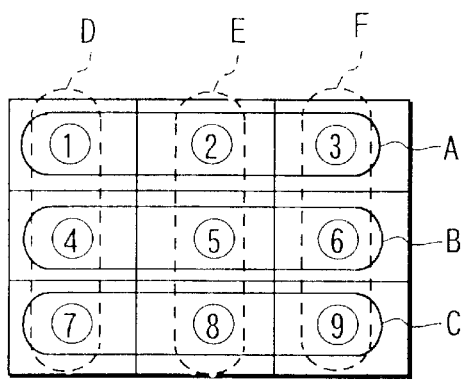
FIG. 13A
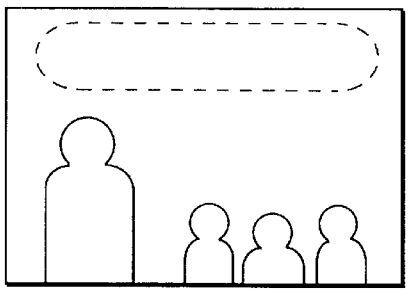
FIG. 13B
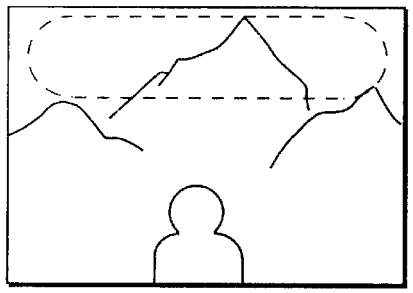
FIG. 13C
FIG. 14A
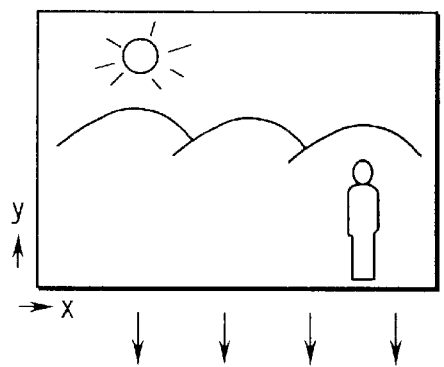
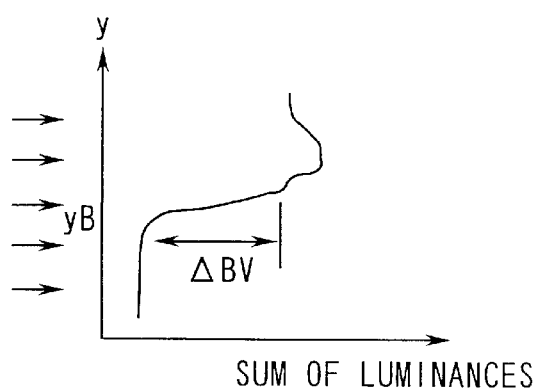
FIG. 14B
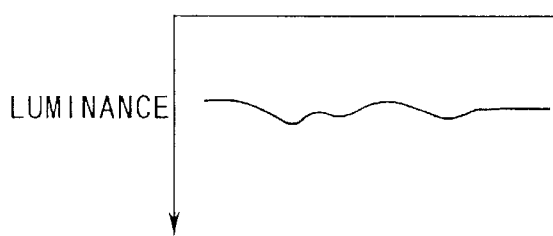
FIG. 14C

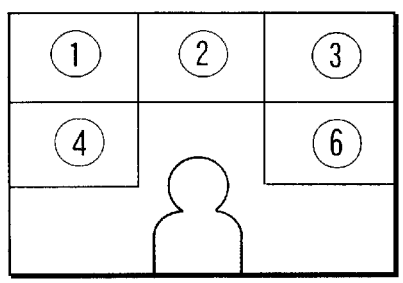
FIG. 22A
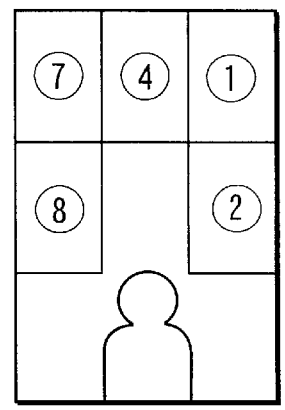
FIG. 22B
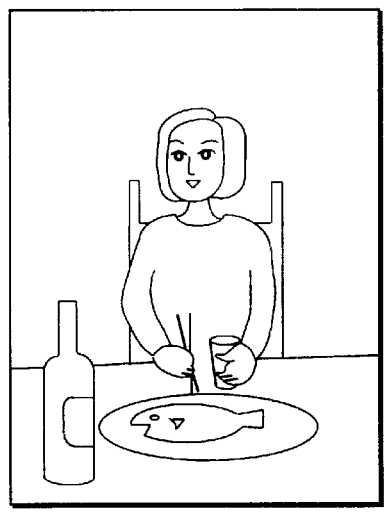
FIG. 23A
| (P7) 1×1 | (P4) 1×1 | (P1) 1×1 |
|---|---|---|
| (P8) 2×1 | (P5) 8×2 | (P2) 2×1 |
| (P9) 2×1 | (P6) 2×6 | (P3) 2×3 |
FIG. 23B
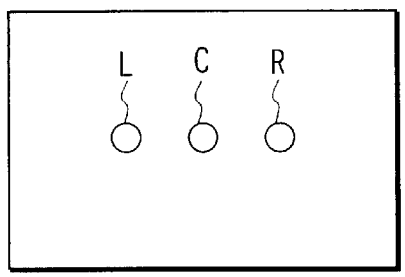
FIG. 24A
(PRIOR ART)
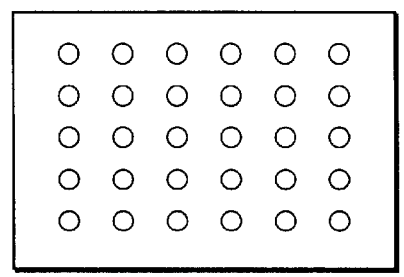
FIG. 24B
(PRIOR ART)

CAMERA WITH A MULTI-POINT DISTANCE MEASURING APPARATUS

CROSS-REFERENCE TO RELATED APPLICATIONS

This application is based upon and claims the benefit of priority from the prior Japanese Patent Application No. 11-257405, filed Sep. 10, 1999, the entire contents of which are incorporated herein by reference.

BACKGROUND OF THE INVENTION

The present invention relates to a multi-point distance measuring apparatus designed to selectively measure the distances to a plurality of points displayed in the finder frame for high-speed focusing and a camera mounted therewith.

Conventionally, the distance measuring apparatus to be mounted on a camera is primarily designed for spot distance measuring, that is, for measuring the distance to a single point (distance measuring point) in a small central area of the picture to be taken (finder screen). Recently, however, the multi-point distance measuring has come to be adopted, the multi-point distance measuring being designed for measuring the distances to plural points within a picture area so that the camera can be focused on a principal subject of picture to be taken regardless of the relative position of the principal subject to other subjects within the picture area.

FIG. 24A shows a case in which there are provided three distance measuring points, one at the center, the other one on left-hand side of the central point and another one on the right-hand side of thereof respectively, while FIG. 25 shows a distance measuring process according to a prior art illustrated by its routine process.

As shown in FIG. 24A, to find the distances to the three distance measuring points, C, L and R, set within the finder screen respectively, first the range to the distance measuring point L is determined out of the three distance measuring points C, L and R by means of integral control, correlation computation and interpolation computation. Similarly, distances to the point C and the point R are determined by the integral control, correlation computation and interpolation computation respectively. Then, the distance to the principal subject in the picture to be taken is selected from the results of the computations (the distances) with respect to the distance measuring points.

A multi-point distance measuring method is disclosed, for example, in Jpn. Pat. Appln. KOKAI Publication No. 10-142490. This distance measuring method is designed for accurately determining the focal point adjusting amount and the exposure amount by specifying the principal subject of the picture to be taken by utilizing the division of the picture area based on a system wherein, with respect to a picture to be taken including plural subjects lying at equal distances in a scope of picture to be taken, the picture to be taken (the depth of field) is divided into plural sub-areas according to the distance measuring points in order to obtain the distance distribution information based on the distances determined according to the distance measuring points and the peak-value frequency distribution based on the distance distribution information.

In the case of such a passive type multi-point distance measuring apparatus, each time the distance to a distance measuring point has to be determined, complex calculation processes such as the picture element integral control, correlation computation, interpolation computation and the like are necessary.

Of these computations, the computation for integral control is a method used for limiting the voltage signal within the dynamic range of the processing circuit when storing the output current of the picture elements constituting the sensor arrays in a capacitor for conversion into electric voltage to be detected after receiving the optical image signal of the subject by two sensor arrays.

In the case of this processing method, in order for the distance to any one distance measuring point to be determined, the integral control, correlation computation and interpolation computation are necessary. Further, these computations cannot be carried out simultaneously and thus are required to be carried out sequentially. Therefore, the greater the number of distance measuring points in an area to be covered in a picture, the higher the distance measuring accuracy, but, on the other hand, it is necessary to repeat the computation for distance measuring an number of times thereby giving rise to a problem that a long time is required for distance measuring.

Further, the correlation computation is applied in determining the relative shift x between the positions images on the respective sides of the two sensor arrays, that is, the relative disagreement between the image on the side of sensor array 2a and the image position on the sensor array 2b in terms of the pitch unit of the picture element (FIG. 4) when the image signals as are shown in FIGS. 5A and 5B are received.

More particularly, the differences among the data of individual light receiving elements of the sensor arrays are measured and added; the differences among the data of individual light receiving elements b are measured and added on the same basis, provided that 1 picture element is shifted; these processes are repeated as calculations; when two image signals coincide with each other, this is considered to indicate that the correlation between these two image signals is sufficiently high to determine an approximate value of the shift x. When the shift is made for appropriate number of picture elements, both the data coincide with each other, and the sum equals to MIN value to prove a best correlation. However, when the sum is not "0", it may be considered that there is a shift smaller than the pitch of the picture elements, indicating the necessity of further interpolation computation.

Repeating such complex calculations a number of times, as in the case of FIG. 24B where 30 distance measuring points are set, it takes 10 times the length of the time required in the case where 3 distance measuring points are set as in the case of FIG. 24A.

However, mere reduction of the distance measuring points can result in an adverse effect such that the principal subject is out of focus if it is located out of the distance measuring points.

Therefore, even in the case of the art disclosed in Jpn. Pat. Appln. KOKAI Publication No. 10-142490, in calculating the distances to the distance measuring points on the time division basis, the calculation of the distance distribution takes a long time. Thus, when (the distance measuring system) is mounted on a camera, it takes a long time from the push at shutter to the point of exposure, causing possible miss of a good timing for clicking shutter.

BRIEF SUMMARY OF THE INVENTION

An object of the present invention is to provide a camera with a multi-point distance measuring apparatus, designed for providing plural distance measuring points within a given picture area, the distance measuring apparatus comprising: a position detector for outputting the information concerning the positions of the distance measuring points-within a given picture area; a multi-point photometer for outputting the information concerning the luminance of the incident light on the distance measuring point; and a priority determiner for determining the priority of the distance measuring computation for the distance measuring points.

The camera with the multi-point distance measuring apparatus as described above is designed to selectively decide the order of distance measuring according to the relative position of the plural points and the luminance distribution of incident light within the scope of the picture in measuring the distance of the plural points within the scope of the picture to be taken. Further, the distance measuring apparatus mounted on a camera designed for sequentially measuring the distance of n number of points within a scope of the picture to be taken is provided with a priority-basis operation means designed for selecting a specific point out of plural points on the basis of the subject point and the luminance distribution within the scope of the picture to be taken, for example, in selecting the M-th point out of N number of points. Such a camera with the multi-point distance measuring apparatus is capable of effecting the integral control of the light receiving elements of all the distance measuring points, deciding the priority of the distance measuring point according to the luminance distribution within the scope of the picture to be taken, performing the correlation computation in the order of the priority of individual distances and performing an interpolation calculation as to (the points) within a predetermined range. Thus, a high-speed focusing can be realized by omitting the distance measuring operation for the points of low priority.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3A is a timing chart for explaining the integral control for the distance measuring apparatus shown in FIG. 1, while FIG. 3B shows an example of the image signal obtained through the integral control.

FIG. 4 shows the basic principle of the trigonometric distance measuring method and its general composition employed for the present invention.

FIGS. 5A, 5B, 5C and 5D are the diagrams for illustrating the interpolation computation process.

FIG. 6A shows an example of a vertically oblong picture to be taken, while

FIG. 7A shows an example of composition including the line sensor arranged for being adaptable to the first embodiment, while

FIG. 13A shows the picture to be taken divided for indicating the positions of respective distance measuring points, while FIGS. 13B and 13C show examples of the pictures to be taken respectively.

FIGS. 14A, 14B and 14C are diagrams illustrating how to recognize the vertical and horizontal composi- tions of a horizontally oblong picture to be taken.

FIG. 22A shows an example of a picture having a horizontally oblong shape, while FIG. 22B shows an example of a picture having a vertically oblong shape.

FIG. 23A shows an example of a picture composition, while FIG. 23B shows an example of priority setting for the distance measuring points of a picture having a composition shown in FIG. 23A.

FIGS. 24A and 24B show examples in which plural distance measuring points are provided in a picture to be taken.

DETAILED DESCRIPTION OF THE INVENTION

Figure 1:
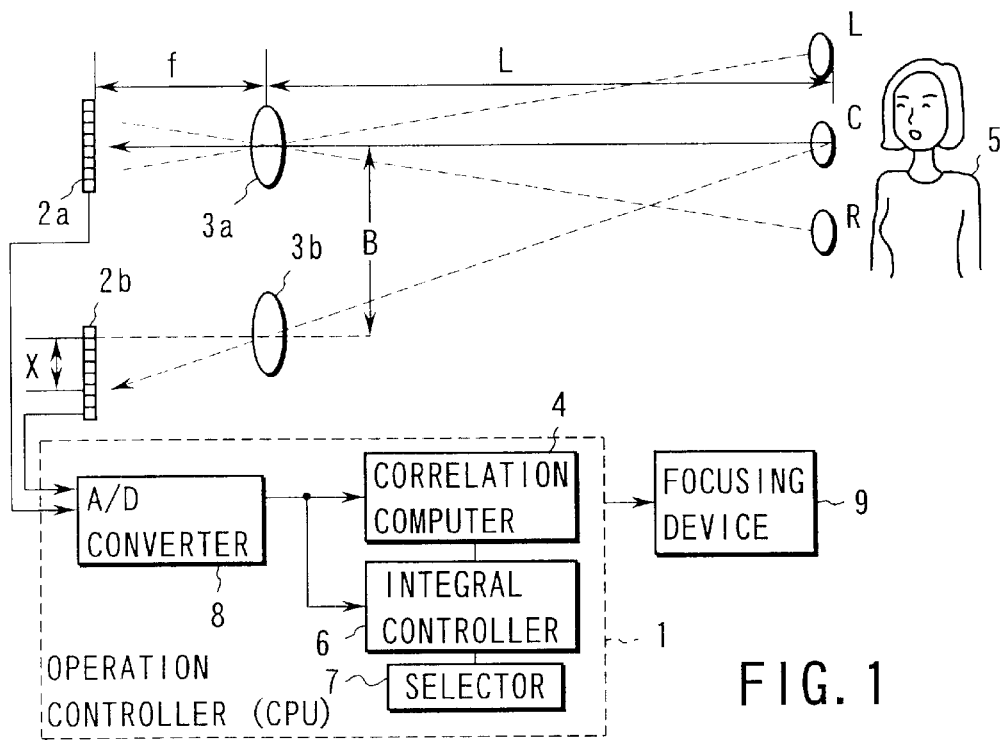
FIG. 1 is a schematic illustration of the distance measuring apparatus relating to the first embodiment of the present invention.

The preferred embodiments of the present invention will be described in the following referring to the relevant drawings.

First, the concept of the distance measuring by using the multi-point distance measuring apparatus according to the present invention.

In the case of a normal distance measuring, based on the recognized the composition of the picture to be taken, the range to the principal subject is selectively calculated. More specifically, based on the result of the integral control of the whole picture to be taken, the priorities of the distance measuring points are determined according to the luminance distribution and position of each of the distance measuring points in a given picture, whereby the interpolation calculations are executed as to the distance measuring points within predetermined ranges in the order of the priority while omitting the distance measuring calculations for the distance measuring points having relatively low priorities, thereby realizing quick focusing.

Next, the explanation will be made as to the method for calculating the difference in the relative positions of the optical patterns in the case of the passive type distance measuring apparatus employed for the present invention. FIG. 4 shows the basic principle of the trigonometric distance measuring method and the general composition of the distance measuring apparatus to operate on the method. With this composition, due to the difference B (length of base line) in the relative position between the light receiving lens $3a$ and the light receiving lens $3b$, the difference x in the relative position of the distribution of the light incidental upon the sensor array $2a$ and that upon the sensor array $2b$ varies depending on the distance L to the subject 5. Assuming that the focal length of each light receiving lens to be f, the distance to the subject can be obtained by the following formula:

$$L = B \cdot f / x \tag{1}$$

Each of the sensor arrays $2a$ and $2b$ outputs current signal according to the amount of incident light. The current signal is converted into digital signal by means of the A/D converter 23 so that the previously mentioned difference x in relative position can be detected by the correlation computation by using the operation unit 24 for computing the amount of image disagreement.

The result is inputted to an operation controller (CPU) 21, comprising one chip microcomputer or the like, to determine the distance to the subject through the computation according to the formula (1). The aforementioned deviation amount computation function, generally consisting of two processes which will be described later, may be incorporated, as a control program, into the CPU 21.

When the above-mentioned method is applied to a camera to adjust the focus of its lens, the CPU 21 controls the operation of the camera, such as the operation of the lens for focusing, by properly controlling the actuator such as a motor, and such a camera can be provided as one with auto focus (AF) function.

Further, in order to determine the image deviation amount by calculation, it is necessary to provide a step for calculation (correlation calculation) for determining the amount of image deviation in terms of the unit of the sensor pitch with respect to both of the line sensors. Furthermore, the step for further computation (interpolation computation) for determining the amount of deviation more exactly on the basis of a higher resolution.

When a light, having a waveform 18 shown in FIG. 14, falls on the sensor array $2a$, the values of the outputs from sensors $R_1$–$R_6$ have a distribution characteristic 19 (dotted curve) as is shown by a histogram given in FIG. 5B. In this case, "R" represents the sensor on the right-hand side, while "L" represents the sensor on the left-hand side, with subscripts 1–6 representing the absolute positions of the sensors.on the basis of, for example, the optical axis of the light receiving lens. In this case, if the left-hand side sensors $L_1$–$L_6$ output the signals equal to those from the sensors $R_1$–$R_6$, this means that the relative position difference x is "0" and that the distance to the subject is infinite.

Further, when the subject is located at a finite distance, the left-hand side sensors L, which are shifted by the number of the sensors that is dependent on the above-mentioned value x and sensor pitch SP (from the right-hand side sensors), give output signals shown in FIG. 5C, which are similar to $R_1$–$R_6$.

The value of FF (i) represented on the y-axis of the rectangular coordinates can be determined by the formula given below.

$$FF\ (i) = \Sigma |R\ (i) - L(i)| \tag{2}$$

That is, the value of FF, as the sum of the absolute values of the differences between the outputs of the sensors R and the outputs of the sensors L, is used. In other words, the absolute value of the difference between Li and Ri is first obtained; the value of i is varied within a certain range, and the varied values are added.

Similarly, the value of FF (i+1) can be determined by the equation given below, where the sensor Ri or Li is shifted by 1 unit, and the difference from the adjacent sensor is determined.

$$FF\ (i+1) = \Sigma |R\ (i1) - L(i)| \tag{3}$$

In this way, the values of FF can be obtained by sequentially varying the amount of shift; since the point at which the value of FF, as the sum of differences between the values of R and the values of L, becomes minimum value ($F_{min}$) is considered to be the best matching point, the amount of shift at this point is obtained as the aforementioned amount of shift S.

Given above is the general process of the correlation calculation.

Further, when the value of S is taken into account, as shown in the output distribution histograms of both the sensor arrays (FIG. 5B), the sensors L, deviated by S, give outputs equivalent to those of the corresponding sensors R (given with subscripts) respectively.

Next, the process of the interpolation calculation will be explained in detail referring to FIGS. 5B–5D.

In practice, however, the disagreement in the image between the two sensor arrays is not necessarily in accordance with the pitch of the sensor, and so it is necessary to detect the disagreement of the image with a finer degree of accuracy. Thus, the interpolation calculation becomes necessary. In FIGS. 5B and 5C, R and L respectively represent the outputs of some of the sensors constituting the sensor arrays $2a$ and $2b$ shown in FIG. 4.

Further, FIG. 5D shows (the outputs of the sensors R and the sensors L), the sensors L being shifted by S (from the sensors R), which have been processed by the interpolation calculation and graphically represented for the ease of comparison. More particularly, $L_0$–$L_4$ are preferable to be written as $L_s + L_{s+4}$, but the letter S is omitted for the simplicity of writing.

Here, assume that the light, which is deviated by x, falls on the sensor L even after (the sensor) having been shifted by S. In this case, the light falling on $R_0$ and the light falling on $R_1$ are mixed when falling on the sensor $L_1$; similarly, the light deviated by x in terms R-basis falls sequentially on each of the L sensors, and so it can be understood that each of the outputs ($L_1$–$L_3$) can be expressed by the Equation (4) given below.

$$\left.\begin{array}{l} L_1 = (1-x) \cdot R_1 + xR_0 \\ L_2 = (1-x) \cdot R_2 + xR_1 \\ L_3 = (1-x) \cdot R_3 + xR_2 \end{array}\right\} \quad (4)$$

The values of FF, namely, $F_{-1}$ and the value of $F_{+1}$ can be expressed by the Equation (5) given below, where the above-mentioned $F_{min}$ and $F_{-1}$ and $F_{+1}$, respectively obtained by shifting $F_{min}$ in positive direction and negative direction, can be expressed, in terms of $R_n$ and $L_n$, by the Equation (5) given below.

$$\left.\begin{array}{l} F_{min} = \Sigma|R_n - L_n| \\ F_{-1} = \Sigma|R_{n-1} - L_n| \\ F_{+1} = \Sigma|R_{n+1} - L_n| \end{array}\right\} \quad (5)$$

Further, by developing Eq. (5) by using Eq. (4), the values $F_{min}$ $F_{-1}$ and $F_{+1}$ can respectively be expressed by Eq. (6) given below.

$$\begin{aligned}
F_{min} &= |R_1 - L_1| + |R_2 - L_2| + |R_3 - L_3| \quad (6) \\
&= |R_1 - (1-x)R_1 - xR_0| + |R_2 - (1-x)R_2 - xR_1| + |R_3 - (1-x)R_3 - xR_2| \\
&= |R_1 - R_1 + xR_1 - xR_0| + |R_2 - R_2 + xR_2 - xR_1| + |R_3 - R_3 + xR_3 - xR_2| \\
&= x|R_1 - R_0| + x|R_2 - R_1| + x|R_3 - R_2| \\
&= x\{|R_1 - R_0| + |R_2 - R_1| + |R_3 - R_2|\} \\
F_{-1} &= |R_0 - L_1| + |R_1 - L_2| + |R_2 - L_3| \\
&= |R_0 - (1-x)R_1 - xR_0| + |R_1 - (1-x)R_2 - xR_1| + |R_2 - (1-x)R_3 - xR_2| \\
&= |R_0 - R_1 + xR_1 - xR_0| + |R_1 - R_2 + xR_2 - xR_1| + |R_2 - R_3 + xR_3 - xR_2| \\
&= |(1-x)(R_0 - R_1)| + |(1-x)(R_1 - R_2)| + |(1-x)(R_2 - R_3)| \\
&= (1-x)\{|R_0 - R_1| + |R_1 - R_2| + |R_2 - R_3|\} \\
F_{+1} &= |R_2 - L_1| + |R_3 - L_2| + |R_4 - L_3| \\
&= |R_2 - (1-x)R_1 - xR_0| + |R_3 - (1-x)R_2 - xR_1| + |R_4 - (1-x)R_3 - xR_2| \\
&= |R_2 - R_1 + xR_1 - xR_0| + |R_3 - R_2 + xR_2 - xR_1| + |R_4 - R_3 + xR_3 - xR_2| \\
&= x\{|R_1 - R_0| + |R_2 - R_1| + |R_3 - R_2|\} + |R_2 - R_1| + |R_3 - R_2| + |R_4 - R_3| \\
&\approx (1+x)\{|R_0 - R_1| + |R_1 - R_2| + |R_2 - R_3|\}(|R_1 - R_0| \approx |R_4 - R_3|)
\end{aligned}$$

Further, where $\{|R_0-R_1|+|R_1-R_2|+|R_2-R_3|\}$ is expressed as ($\Sigma\Delta R$), the preceding deviation amount x can be obtained by computation using Eq. (7) without depending on ($\Sigma\Delta R$), that is, the interpolation computation.

$$(\Sigma\Delta R) = \{|R_0 - R_1| + |R_1 - R_2| + |R_2 - R_3|\} \quad (7)$$

$$F_{min} = (\Sigma\Delta R)x$$

$$F_{-1} = (\Sigma\Delta R)(1-x)$$

$$F_{+1} = (\Sigma\Delta R)(1+x)$$

$$\therefore \frac{F_{-1} - F_{min}}{F_{+1} - F_{min}} = \frac{(\Sigma\Delta R)(1-x) - \Sigma\Delta Rx}{(\Sigma\Delta R)(1+x) - (\Sigma\Delta R)x}$$

$$= \frac{\Sigma\Delta R(1-2x)}{\Sigma\Delta R} = 1 - 2x$$

These computations are executed operation unit 24 shown in FIG. 4, but may be executed according to predetermined program by using the operation controller (CPU) 21. When the CPU 1 is provided with a program for computing the amount of the movement of the lens for focusing based on S and x obtained as described above, the camera incorporating such a CPU is capable of serving as a camera with an auto focus (AF) function.

However, it is an important problem how to select a specific distance measuring point out of plural distance measuring points (multi-point distance measuring) in measuring the distance to the subject by using the aforementioned computations.

Figure 6A:
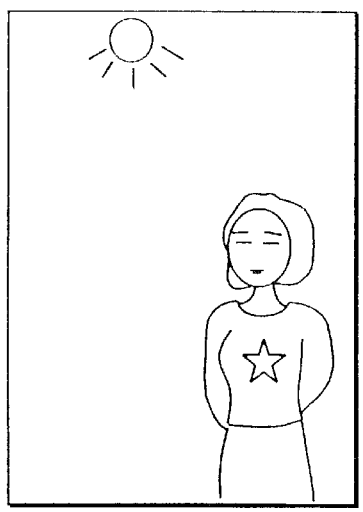

For instance, in taking the picture having a composition as is shown in FIG. 6A, it is necessary for the point marked with a star, that is, the subject (a person) in the picture, should coincide accurately with the properly measured distance and focal point; in order to do so, the camera should be capable of correctly detecting the position of the star mark for the correlation computation and interpolation computation to be carried out.

Figure 6B:
FIG. 6B shows a horizontally oblong picture to be taken.

However, if a photographer has changed the composition of the picture to be taken to one as is shown in FIG. 6B by changing camera position, this results in that the position of the star mark coinciding with the position of a person as a subject is shifted towards the direction of the sun, which has originally been located near the upper portion of the picture fame, thereby causing the camera to becomes more apt to be affected by the sunlight and reducing the chances of taking a good picture of the person as the principal subject of the picture. Thus, it is difficult to take a picture focused on its principal subject unless the image signal is detected correctly even if the number of distance measuring points is increased.

FIG. 1 is a schematic diagram illustrating the composition of the first embodiment of the present invention.

This distance measuring apparatus is designed to operated on the principle of trigonometric measurement method. First, the image of the subject 5 falls on the sensor arrays 2a and 2b, each comprising the line sensors, respectively through the light receiving lenses 3a and 3b. The current signals, according to the amount of the received light, outputted from the light receiving elements of the sensor arrays 2a and 2b are converted into digital signals through A/D converter 8 and inputted to the correlation computer 4 incorporated into the operation controller (CPU) 1 to determine the amount of image disagreement. The relative position difference is detected based on the image disagreement amount. The relative position difference is used in determining the distance L to the subject by the CPU 1. Based on this distance to the subject, the focus of the photographing lens (not shown) is adjusted by focus controller 9.

Further, the CPU 1 incorporates the integral controller 6 for determining the luminance distribution by the integration of the whole picture area and the selector 7 for selecting the distance measuring point within the picture area. Further, the operation controller 1 is provided not only with the function for executing the calculation but also with the function for generally controlling the distance measuring operation and various components of the camera.

Figure 2:
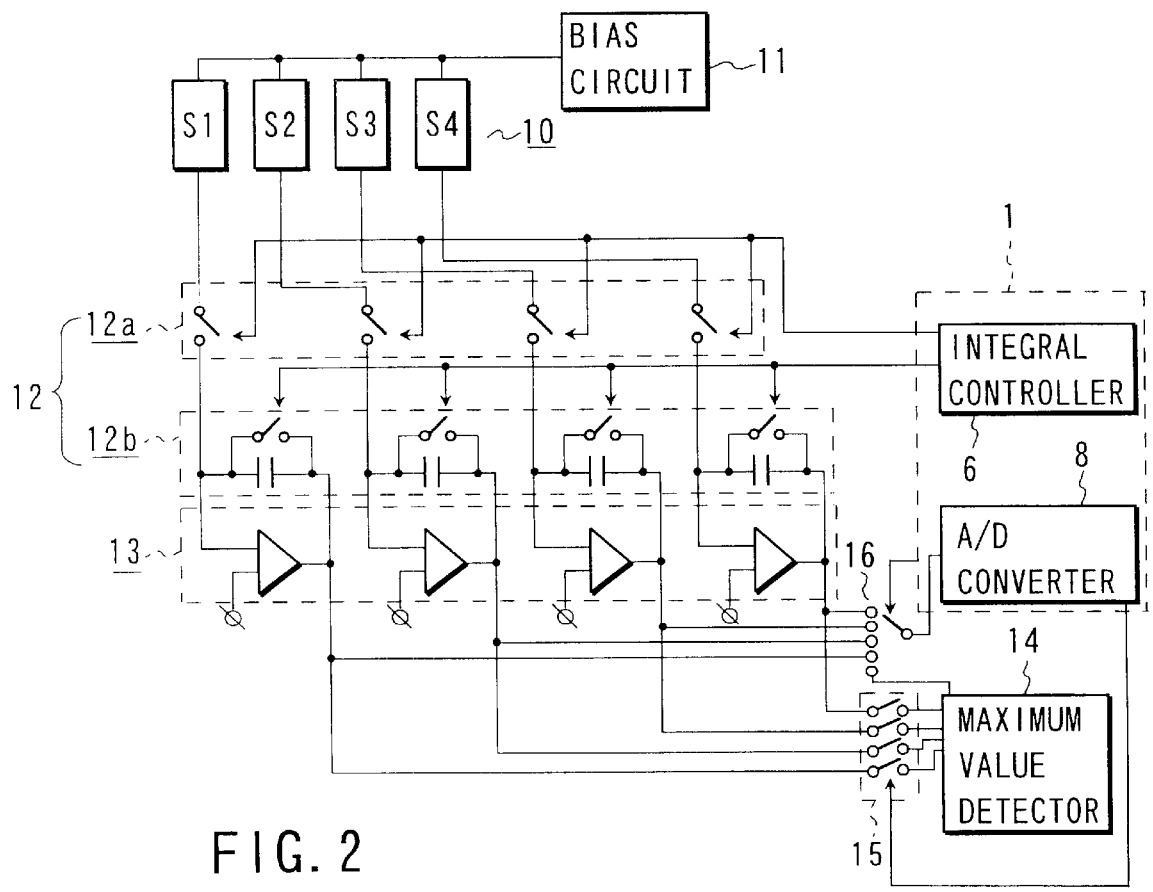
FIG. 2 shows the composition of the integral control system including a part of the sensor array (line sensor) to be used with the distance measuring apparatus shown in FIG. 1.

FIG. 2 is a diagram showing a section of the composition, including a part of the sensor array (line sensor), for the integral control.

This composition comprises light receiving elements 10 (S1–S4) constituting the sensor arrays 2a and 2b, vias circuit 11 for applying vias electric source to the light receiving elements S1–S4, integral switch group 12, which respectively open and close according to the control by the integral controller 4, are respectively connected to the output terminals of the light receiving elements S1–S4, current integrating amplifiers 13 (A1–A4) for outputting the voltage signal according to the integral amount of the signal output from the light receiving elements S1–S4, maximum value detector 14 for detecting the maximum value of the voltage signal, maximum value detector group 15 for selecting the voltage'signal coming from current integrating amplifier 13 for input to the maximum value detector 14 under the control of the CPU 1 and selection switch 16 for selectively receiving either the voltage signal from the current integrating amplifier 13 or the maximum output signal from the maximum value detector 14 for output to the A/D converter 8.

The above-mentioned light receiving elements S1–S4 output signal current according to the amount of received light, by using the bias circuit 11 as a power source. This signal current is led to the integrating amplifiers A1–A4 when the integrating switch group 12a (switches for controlling the start and end of integration) are ON, while the voltage signals according to the outputs of individual amplifiers are outputted when reset switch group 12b are OFF.

By reading the results of the above operations, the focusing can be accomplished after undergoing the correlation computation illustrated in FIG. 4. However, since the amounts of light falling on the sensors S1–S4 vary depending on the color and reflectivity of the subject, in order to determine the integration amount properly by integration within a limited dynamic range, it is necessary to employ an accurate integration control process.

In other words, if the integrating time is too short, the result of integration becomes too flat to obtain differences, while if the integrating time is too long, the result of integration becomes even due to the saturation of the circuit. As is obvious from the correlation computation process, when the contrast in the image is weak, the correlation of the images obtained by the two sensor arrays also becomes weak, affecting adversely on the accuracy of distance measuring.

Thus, (in order to overcome this problem,) a method for completing the integration at the proper level determined by monitoring the result of integration on real-time basis is employed. The sensor whose output is to be monitored is selected by selecting a proper switch to be turned on out of the switch group 15 provided for detecting maximum value.

A timing chart for turning on these switches for the integration control is shown in FIG. 3A.

Where the light is received by the light receiving elements S1–S4, first the resetting switch group 12b are turned on to set the output to the reference level, and this is followed by the turning-on of the integration switch group 12a and subsequent turning-off of the resetting switch group to start the integrating process to the timing T1.

When selection switch 16 has selected maximum value detection circuit 14, the integral output of the maximum value detection circuit 14 selects the maximum integral value for input to the A/D converter 8, so that CPU 1 controls the output of the A/D converter for monitoring the outputs sequentially. As long as integrating switch group 12a is designed to be turned off before exceeding the dynamic range, the integral output of each sensor will not exceed the dynamic range.

After ending the integrating operation, the integral outputs of the light receiving elements S1, S2, S3 and S4 are subject to A/D conversion, so that the outputs of the sensors can be monitored sequentially by the CPU1.

FIG. 3B shows the image signal obtained through the processes described above; the output of the image signal varies depending on the incident condition of the light, that is, a weak light brings about a low output, while a strong light brings about a high output. With such a method, the distance measuring apparatus of the camera becomes capable of obtaining proper image signal.

Further, through the control by the CPU 1, switches 15 are opened or closed for having only a specified switch connected to the maximum value detection circuit 14; however, in the cases of aforementioned 4 sensors, even if the sunlight falls on the light receiving element S1 as in the case shown in FIG. 6B, there is no chance of having the integrating operation controlled by the strong light from the sun unless the connection is made to this light receiving element S1.

On the contrary, when the monitoring of the integration is affected by the direct sunlight, the integration control ends before the image signal of the ordinary subject of the picture is obtained, thereby making accurate distance measuring impossible in many instances. Similar instances can occur even if the circuit 14 is designed for the average value detection or for the detection of the difference of the maximum value and the minimum value other than the maximum value.

In the case of the composition shown in FIG. 1A, when the lights indicated with dotted lines are used, the ranges to the points other than the point C corresponding to the center of the picture, that is, the points L and R, which are deviated in the direction along the length of the base line respectively, can also be measured.

Figure 7A:
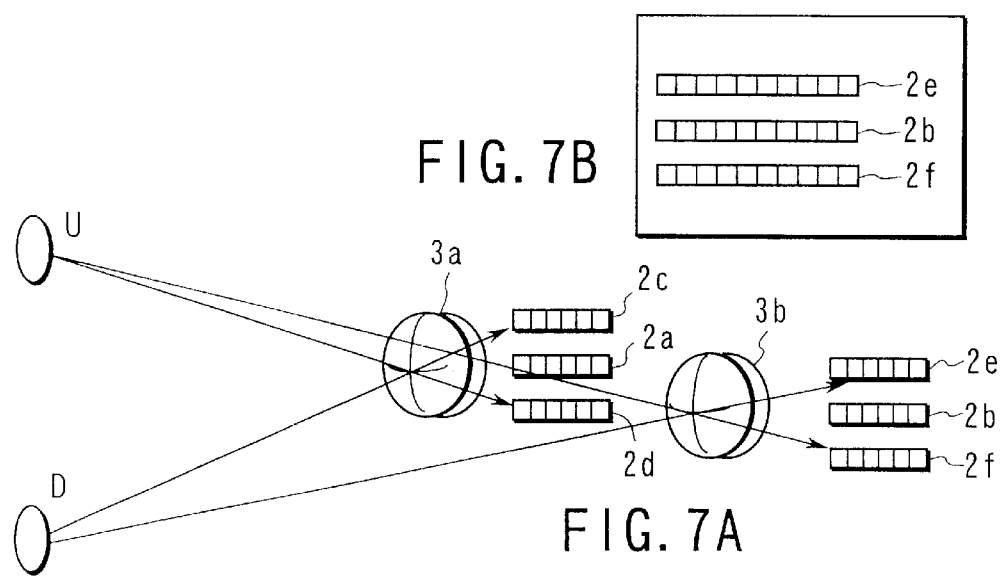

Further, FIG. 7A is a schematic diagram illustrating the concept of a distance measuring apparatus comprising 3 line sensors obtained by arranging additional line sensors 2c and 2c above and blow the line sensor 2a along the base line of 2a and by arranging additional line sensors 2e and 2f above and below the line sensor 2b along the base line of the line sensor 2b respectively.

Figure 7B:
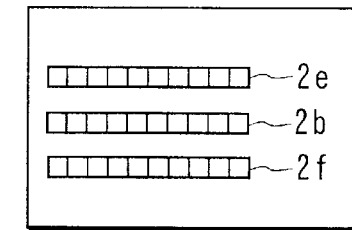
FIG. 7B shows the ranges to be found according to the composition (given in FIG. 7A).

With this composition, as shown in FIG. 7A as an optical path, the distances to points U and D become measurable, and, as shown schematically in FIG. 7B, the distances to many points in the picture to be taken become measurable.

Figure 8:
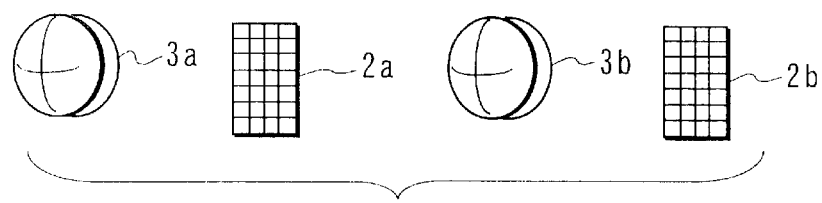
FIG. 8 shows an example of composition of the area sensor adapted to the first embodiment.

If this concept is extended, as shown in FIG. 8, by using so-called area sensors, formed by fully covering the picture area with the light receiving elements, instead of increasing the number of the line sensors, it becomes possible for the picture area to be thoroughly monitored by increasing the distance measuring points to 30 points or more, for example, as in the case shown in FIG. 24B. With such a device, a distance measuring apparatus, capable of distance measures accurately regardless of the location of the subject in the picture to be taken, can be provided.

Figure 15A:
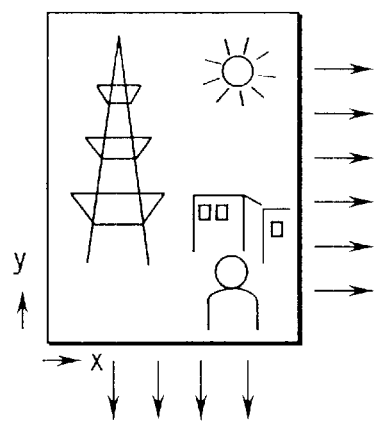
FIGS. 15A, 15B and 15C are diagrams illustrating how to recognize the vertical and horizontal compositions of a vertically oblong picture to be taken.

For instance, with the composition described above, a camera, capable of focusing even on a subject (a person) near an edge of a picture frame, can be provided unlike in the cases of the compositions as are shown in FIG. 14A and FIG. 15A, with which only the distance to a point located in the center of the picture can be measured.

However, the wider the range of the distance measurement, the greater the chance of measuring the distances to the objects other than the principal object, thereby increasing the chances of erroneous measurement as a side effect.

The embodiment of the present invention capable of solving the problems of the prior art described above will be explained in the following.

For instance, in the cases of the pictures shown in FIGS. 6A and 6B, as long as the distance to a person, the principal subject, in a picture is measured once to focus a camera on the subject, the occurrence of the problems such as out-of-focus condition and time lag, resulting from measuring other point than the principal subject or erroneous measurement of the distance, can be prevented even when the location of the principal subject in the picture has changed to some extent as the result of minor shift of camera position unless the photographer moves apart from its original position.

Further, in general, the composition of a picture includes upper portion and lower portion (the sky and the ground) between which the principal subject is located. More particularly, in a composition of a picture, the principal subject is located in the center, while the objects such as the sky and the sun having higher luminance than that of the principal subject in many instances exist, and the principal subject is discriminated from others by utilizing to some extent the information concerning the locations of other objects such as the sky or the like. However, it is also necessary for the camera to be provided with a device designed for detecting the direction of the camera, since the position of the camera has to be changed by the photographer depending on the composition of the picture to be taken, that is, whether the picture to be taken is vertically oblong or horizontally oblong.

The vertical/horizontal direction detecting mechanism for detecting whether the picture frame is vertically oblong or horizontally oblong is composed of a casing 27, containing a conductive substance 26 such as the mercury and incorporated into the camera 25, and a plurality of main poles 28a, 28b, 28c, 28d and 28d inserted into the casing 27. The position of the camera can be detected by distinguishing by the CPU 1 the main poles between which the short has occurred because of the presence of the conductive substance 26. For example, the short between main poles 28b and 28c indicates that the camera is positioned for horizontally oblong picture; the short between main poles 28a and 28b, for vertically oblong picture; the short between main poles 28b and 28d, for upward position.

Figure 10:
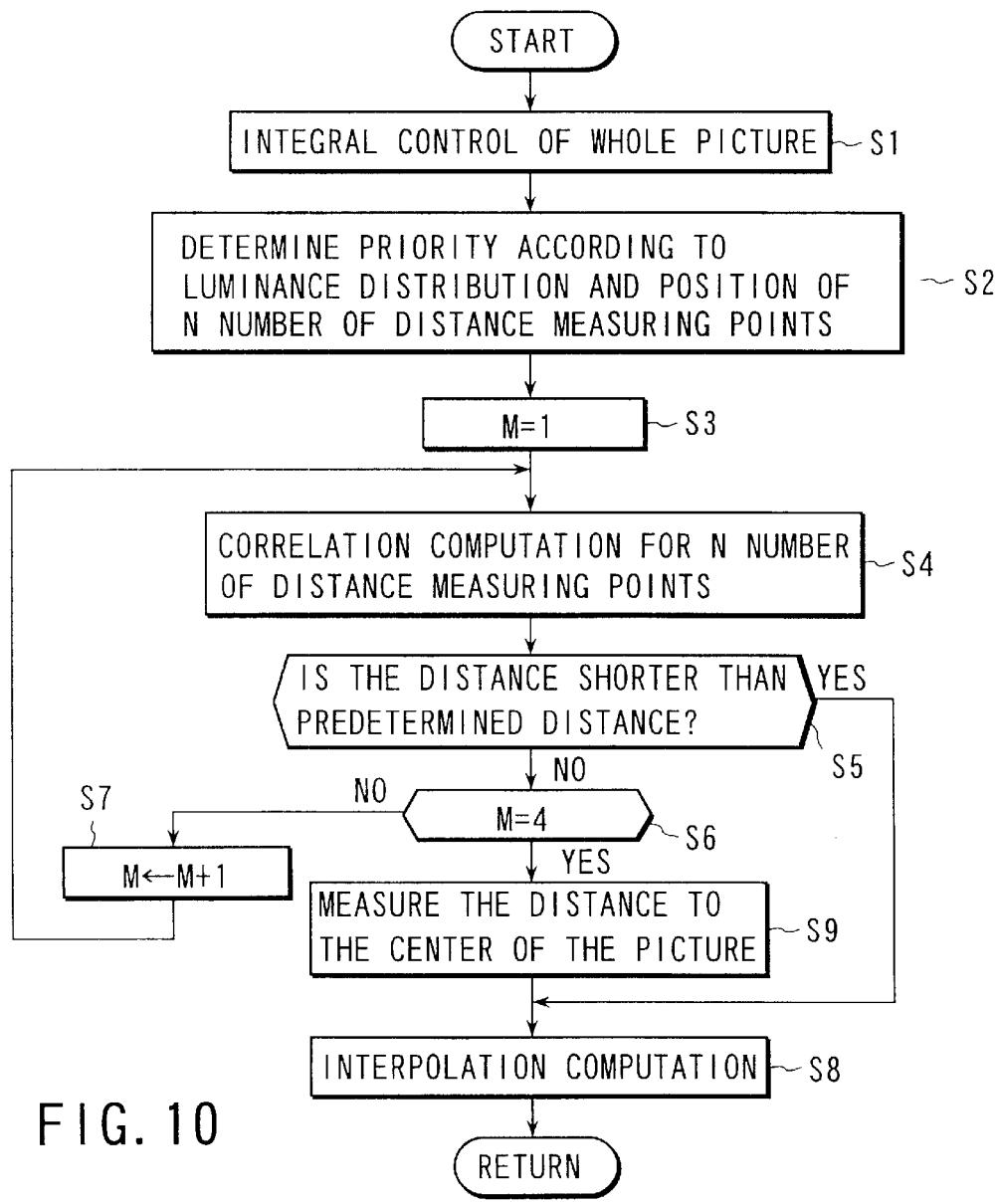
FIG. 10 is a flow chart for explaining the main routine of the distance measuring by the distance measuring apparatus according to the first embodiment.

Next, the main routine of the distance measuring operation by using the distance measuring apparatus according to the first embodiment of the present invention will be described in the following referring to the flow chart given in FIG. 10.

First, in the cases of the compositions given in FIG. 1 and FIG. 8 respectively, the light is received by all the n number of distance measuring points within the area of the picture to be taken, and the result of integration for the whole area of the picture (with respect to all the distance measuring points) is obtained (Step 1).

Next, the priority of each distance measuring point is determined according to the luminance distribution and location of each distance measuring point within the picture area, which will be described later (Step 2). Concerning the priority of the distance measuring point according to its location, for example, in the case of the picture having a composition shown in FIG. 6A, the first priority is given to a person as the principal subject of the picture, while the lowest priority is given to the position of the sun. The initial value of the number of times of determination (of the priority) is set to 1 (Step 3). In the case of this embodiment, number of times of determination (of the priority) is set to 4 times.

Next, the integral voltage signal of the distance measuring point, having a high priority determined in the above-mentioned step S2, is inputted to the A/D converter by operating selection switch 16, and the signal converted into a digital signal undergoes the correlation calculation by means of the CPU 1 (Step S4). Then, it is determined whether the distance to the subject found by the correlation calculation is close to the predetermined distance or not (Step 5). When it is determined that the measured distance to the subject is greater than the predetermined distance (the case of NO), it is determined whether or not the number of times of the determination has reached 4 times (Step S6). If 4 times has not been reached (in the case of NO), increment is made (Step S7), the processing returns to the above-mentioned step S4.

On the other hand, when the distance to the subject is less than but close to the predetermined distance (in the case of YES), the interpolation computation is carried out for the result of the correlation computation with respect to the distance to the subject at the corresponding distance measuring point (Step S8), and processing returns. Further, concerning the determination made in the step S6, when the predetermined number of times (M) of determination has reached 4 times (in the case of NO), the subject is assumed to be located at the center (step S9), and the processing proceeds to the step S8 for executing the interpolation computation for the result of the correlation computation obtained with respect to the distance measuring point at the center of the picture, this process being followed by the return process.

According to the present embodiment, the integral control of all the distance measuring points of the picture to be taken are controlled by the light receiving elements to determine the priority of the computation processing according to the luminance distribution and location (of the distance measuring points), whereby the correlation computation can be executed starting from that for the integral signal with the highest priority, and the interpolation computation is executed only for the subject at a distance within predetermined distance range, so that the measurements of distances to the points with low priorities are omitted for enabling prompt focusing.

Figure 11:
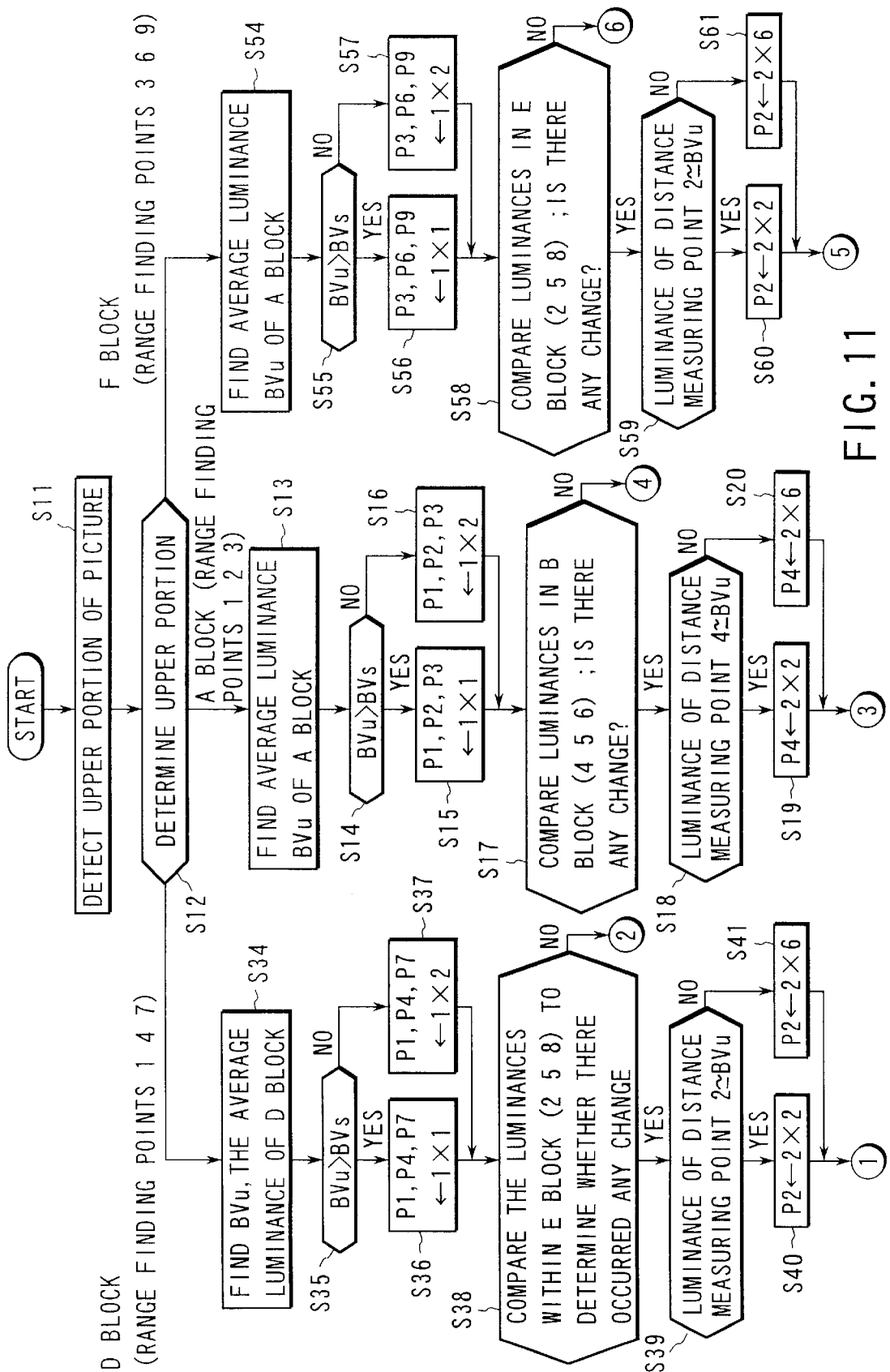
FIG. 11 is a flow chart for explaining in detail the process of determining the priority (of distance measuring point) by using the vertical and horizontal detection mechanism.
Figure 12:
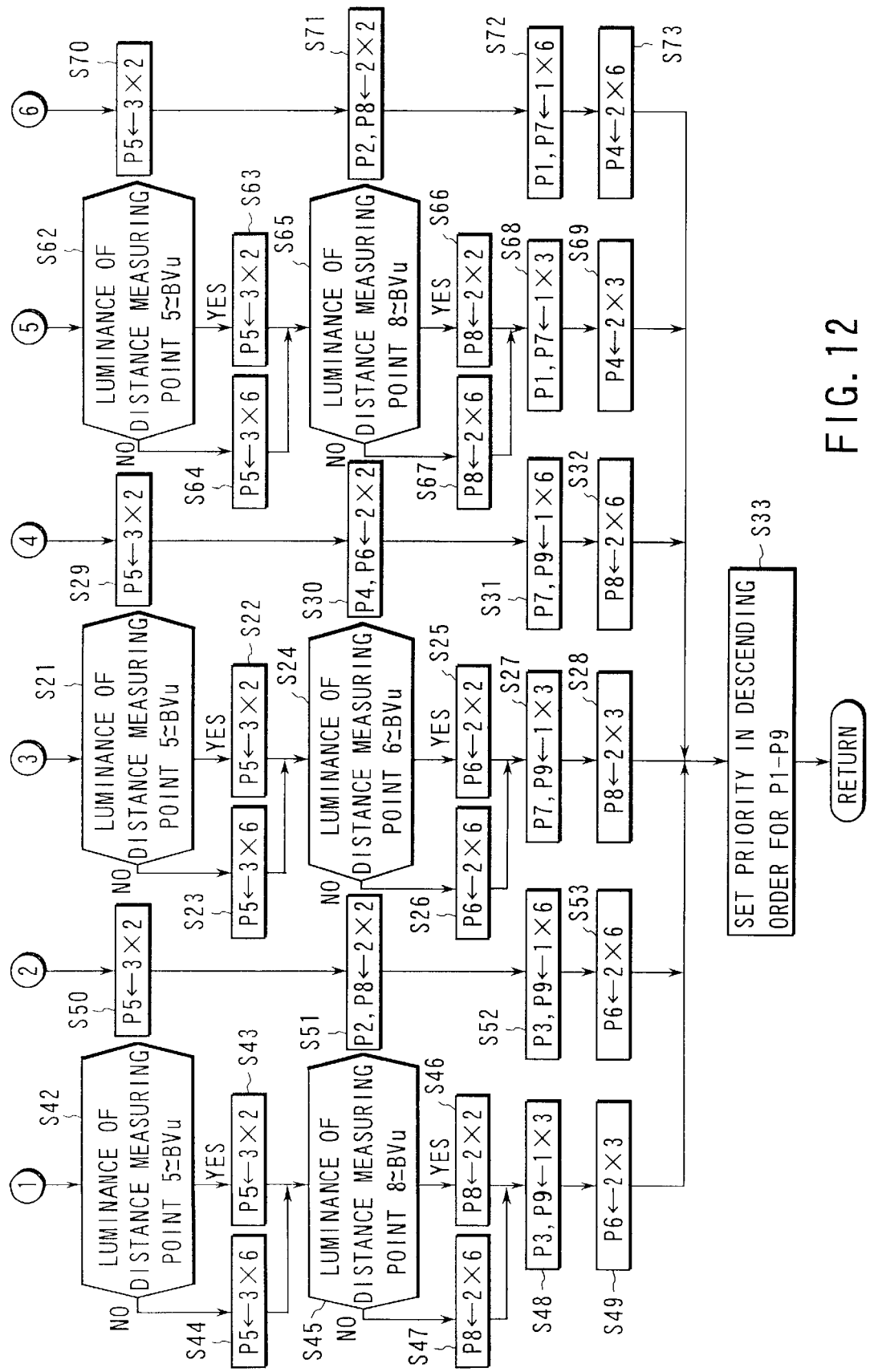
FIG. 12 is a flow chart for explaining the process for determining priority (of the distance measuring point) following the flow chart of the same purpose given in FIG. 11.

Next, the process for setting priority (of the distance measuring point) in the step S2 given in FIG. 10 will be described in detail in the following referring to the flow charts given in FIG. 11 and FIG. 12. Further, in connection with FIG. 11 and FIG. 12, FIG. 13 shows an example in which the picture to be taken is divided into 9 distance measuring areas 1–9 (hereinafter referred to as "distance measuring points"), while FIGS. 13B and 13C respectively show an example of the picture to be taken. In the following explanation, the block including distance measuring points 1, 2 and 3 arranged horizontally to one another is defined as A-block; the block including distance measuring points 4, 5 and 6 is defined as B-block; the block including distance measuring points 7, 8 and 9 is defined as C-block, while the block including the distance measuring points 1, 4 and 7 arranged vertically to one another is defined as D-block; the block including the distance measuring points 2, 5 and 8 is defined as E-block; the block including the distance measuring points 3, 6 and 9 is defined as F-block. Further, in the case of this embodiment, 9 distance measuring points are provided in the picture area as an example as is shown in FIG. 13A, but the number of distance measuring points is not limited to this and thus may be increased to larger numbers.

Figure 9A:
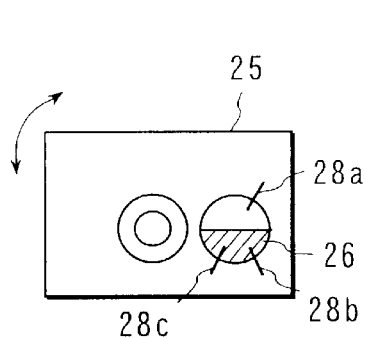
FIGS. 9A, 9B and 9C show the examples of the compositions of the vertical and horizontal detection mechanism for detecting the direction of the camera.
Figure 9B:
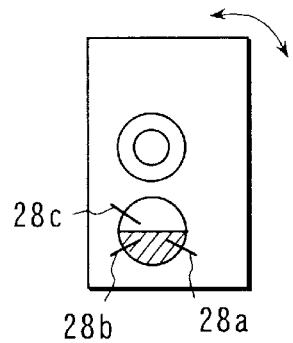
Figure 9C:
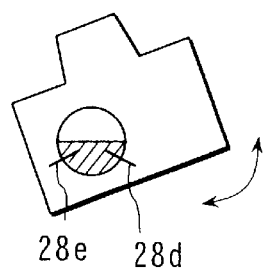

First, the location of the upper portion of the picture to be taken is detected by using the camera position detection mechanism shown in FIG. 9 (step S11) to determine which block comes to the upper portion of the picture (step S12).

The camera position detector determines which of A-block, D-block and F-block comes to the upper portion of the picture; according to the present embodiment, [1] the upper portion of the picture is [a space], the area in which the principal subject is not existing; [2] the principal subject located under the uppermost ranging finding point; [3] the principal subject is most likely to exist in central area of the picture. Thus, the sequence (of the program) is based on the basis described above. Therefore, the explanation of this embodiment will be made on the basis that the camera is held normally for taking a horizontally oblong picture (i.e., the picture in which A-block comes to its upper).

In the case of such a picture composition, since the A-block is very likely to be occupied a blank space (sky), the average luminance BVu of the A-block is found so that it can be used as the criterion for discrimination (step S13). This luminance information is used in discriminating not only the blank (sky) space of A-block (including the distance measuring points 1, 2 and 3) but also in discriminating the distance measuring points 5 and 6 as being blank points. However, it is hard to determine whether there is no need of distance measuring as to the uppermost block for the reason that the uppermost block is very likely to be a blank (sky) space, and so the average luminance BVu is compared with the predetermined luminance BVs (step S14); if the luminance (of the uppermost block) is higher than the predetermined luminance (YES), (the uppermost block) is very likely to be a blank (sky) space, and the priority coefficient 1×1 is given to (the uppermost block) out of the priority coefficient P (P1, P2, P3) (step S15).

In the case discussed above, "1", the priority coefficient preceding "1×1", is a weighted value relating to the locations of the distance measuring points 1–9 shown in FIG. 13A; the distance measuring points 1, 3, 7 and 9 at the four corners of the picture and the distance measuring point 2 at the center (of the uppermost block) are considered to be less likely to correspond to the position of the principal subject and are given a priority coefficient "1"; the distance measuring points 4, 6 and 8 located in the middle block, not including the above-mentioned area, is given weighted value "2", according to their positions (hereinafter referred to as "value weighted according to position); the distance measuring point 5 at the center of the picture is given the priority coefficient "3" as being a point where the (the principal subject) is very likely to exist.

Further, the value "1" following the value "1×1" represents the value weighted according to the luminance or the variation of the luminance (hereinafter referred to as "weighted luminance"); for example, a blank space is less important in terms of the need for the measurement of the distance thereto and is given the weighted value "1", and the weighted value is increased to "2", "3" and "6" depending on the conditions.

In the case of the present embodiment, the "blank (sky) space" is an area where the principal subject is least likely to exist, so that the priority coefficient thereof is defined to be 1×1=1, where the first 1 represents (a value weighted by position), while the second 1 represents (a value weighted by luminance).

In the step S14 described above, if the average luminance BVu is lower than the predetermined luminance BVS (the case of NO), priority coefficient "1×2" is applied. For example, this priority coefficient is applicable to the case where a mountain range is included within the sky space of a given picture as in the case of the picture composition given in FIG. 13C. However, preceding "1" will remain unchanged since being (the priority coefficient according to position).

As described above, after determining the priority coefficient of the A-block, the distance measuring points (in the lower blocks of the picture) are discriminated; first, the luminance is compared within the B-block (among the distance measuring points 4, 5 and 6) to determine whether there is any change (in the luminance level) (step S17). For instance, there is change (in the luminance level) in the case shown in FIG. 13B, while there is no change in the case shown in FIG. 13C.

If any change is detected (in the case of YES), the luminance level of the distance measuring point 4 in the B-block is compared with the previously measured luminance BVu of the A-block (uppermost block)(step S18); when the luminance levels are found to be equal (in the case of YES), the distance measuring point 4 is considered to be blank (sky), and the weighted luminance level is set to "2" [priority coefficient P4: 2×2] (step S19). When there is difference in the luminance level (in the case of NO), the weighted luminance level is set to "6" [priority coefficient P4: 2×6] (step S20).

Similarly, the luminance level of the distance measuring point 5 of the B-block is compared with the luminance BVu (step S21); when the luminance levels are equal (in the case of YES), the weighted luminance level of the distance measuring point 5 is set to "2" [priority coefficient P5: 3×2] (step S22); when there is difference in the luminance level (in the case of NO), the weighted luminance level is set to "6" [priority coefficient P: 3×6] (step S23). Further, the luminance level of the distance measuring point 6 is compared with the luminance BVu (step S24); if the luminance levels are equal (in the case of YES), the weighted luminance level of the distance measuring point 6 is set to "2" [priority coefficient P6: 2×2] (step S25); if there is difference in the luminance level (in the case of NO), the weighted luminance level is set to "6" [priority coefficient P6: 2×6] (step S26).

Next, the positional weighted values of the distance measuring points 7 and 9 are set to "1" respectively, and the weighted luminance level of the same are set to "3" [priority coefficient P7 and P9: 1×3] (step S27); the positional weighted value of the distance measuring point 8 is set to "2", and the weighted luminance level of the same is set to "3" [priority coefficient P8: 2×3] (step S28).

On the other hand, in the previously mentioned step S17, when there are no differences in luminance level among the distance measuring points 4, 5 and 6) of the B-block (in the case of NO), such picture composition corresponds to the picture composition shown in FIG. 13C, wherein the distance measuring points 4, 5 and 6 show similar luminance distributions. When there are no luminance differences, the positional weighted value of the distance measuring point 5 is set to "3", and the weighted luminance level is set to "2" [priority coefficient P5: 3×2] (step S29), while the positional weighted values of the distance measuring points 4 and 6 are set to "2", and the weighted luminance level is set to "2" [priority coefficient P4 and P6: 2×2] (step S30).

Further, the C-block (distance measuring points 7, 8 and 9), below the B-block, is considered to be very likely to include the principal subject, so that the weighted luminance levels of the distance measuring points 7, 8 and 9 are set to "6"; the positional weighted values of the distance measuring points 7 and 9 are set to "1", while the weighted luminance levels are set to "6" [priority coefficients P7 and P9: 1×6] (step S31); the positional weighted value of the distance measuring point 8 is set to "2", while the weighted luminance level thereof is set to "6" [priority coefficient P8: 2×6] (step S32].

The order of priority is set so that the distance measuring processing can be carried out starting from the distance measuring point with the highest value of priority coefficients which are set according to the procedures described in the foregoing (step S33).

The explanation will be made as to the order of the priority in the following.

According to the established rule of weighting, the priority coefficient of the distance measuring points 7 and 9 is "6", while the same for the distance measuring point 8 is "12".

In the above case, the priority coefficient of the distance measuring point 8 is "12", while the priority coefficient of the distance measuring points 5, 7 and 9 is "6", and these distance measuring points are higher than others in the order of priority.

For instance, in the case of the picture composition shown in FIG. 13B, the priority coefficients of the distance measuring points 4, 5 and 6 are "12", "6" and "4", respectively; concerning the distance measuring points 7, 8 and 9 of the lowermost block, the priority coefficients of the distance measuring points 7 and 9 become "3", while the priority coefficient of the distance measuring point 8 becomes "6", by being multiplied by weighted value "3" on the basis of the estimates of (the undetermined luminance levels) of the remainders (of the distance measuring points). Consequently, the priority of the distance measuring is in the order of the distance measuring points 4, 5 and 8.

As mentioned previously, according to the weights P1–P9 of the priority coefficients of the distance measuring points 1–9, in the case of the picture composition given in FIG. 13B, the priority of distance measuring is in the order of the distance measuring points 4, 5, 8 . . . , while in the case of the picture composition given in FIG. 13C, the priority is in the order of the distance measuring points 8, 5, 7, 9 . . .

Further, where the D-block (including distance measuring points 1, 4 and 7) is found to be an uppermost block in the step S12, indicating that the camera is held for vertically oblong picture composition, the middle block is E-block including the distance measuring points 2, 5 and 8, and the lowermost block is F-block including the distance measuring points 3, 6 and 9.

Therefore, concerning the setting of the priority coefficients for the A-block, B-clock and C-block, if the setting of the A-block is substituted for the D-block, the setting of the B-block for the E-block and the setting of the C-block for the F-block, an equivalent (priority setting) sequence can be made available only by changing the distance measuring points involved in the steps S14–S32 and the steps S35–S53.

In the case of such a vertically oblong picture composition, since the D-block is very likely to included the blank (sky) space, the average luminance BVu is obtained for use as a discrimination criterion. Similarly to the step S14, the average luminance BVu and the predetermined luminance BVs are compared (step S35); if the level of the former is higher than the latter (in the case of YES), it is very likely that (the point concerned) is included in a blank space (sky), the priority coefficient P (P1, P4, P7) is set to 1×1 (step S36). Further, in the case of this picture composition, the positional weights of the distance measuring points 1, 3, 7, 9 and 4 are set to "1", the weights of the distance measuring points 2, 6 and 8 to "22" and the weight of the distance measuring point 5 at the center of the picture, where the (subject) is very likely to exist, to "3".

In the above step S35, if the average luminance BVu is lower than the predetermined luminance BVs (in the case of NO), the priority coefficients of the distance measuring points 1, 4 and 7 are set to "1×2" (step S37).

Next, the luminance levels of within the E-block (including the distance measuring points 2, 5 and 8) are compared to determine whether there are any variations (step S38). When any variations are detected (in the case of YES), the luminance level at the distance measuring point 2 in the E-block is compared with the average luminance BVu (step S39). If the luminance levels are equal (in the case of YES), the weight of the luminance of the distance measuring point 2 is set to "2" [priority coefficient P2: 2×2] (step S40). However, if the luminance levels differ (in the case of NO), the weight of the luminance is set to "6" [priority coefficient P2: 2×6] (step S41).

Similarly, the luminance of the distance measuring point 5 is compared with the luminance BVu (step S42); if the luminance levels are equal (in the case of YES), the weight of the distance measuring point 5 is set to "2" [priority coefficient P5: 3×2] (step S43); when the luminance levels differ (in the case of NO), the weight of the luminance is set to "6" [priority coefficient P5: 3×6] (step S44). Further similarly, (the luminance of) the distance measuring point 8 is compared with the luminance BVu (step S45); when the luminance levels are equal (in the case of YES), the weight of the distance measuring point 8 is set to "2" [priority coefficient P8: 2×2] (step S46); when the luminance levels differ (in the case of NO), the weight of the luminance is set to "6" [priority coefficient P8: 2×6] (step S47).

Next, the positional weights of the distance measuring points 3 and 9 are set to "1", and the weights of the luminance are set to "3" [priority coefficients P3 and P9: 1×3] (step S48); the positional weight of the distance measuring point 6 is set to "2", while the weight of luminance is set to "3" [priority coefficient P6: 2×3] (step S49).

On the other hand, in the above step S38, when the luminance levels within the E-block (including distance measuring points 2, 5 and 8) have not been compared (in the case of NO), the weight of the distance measuring point 5 is set to "3", while the weight of the luminance is set to "2" [priority coefficient P5: 3×2] (step S50); the positional weights of the distance measuring points 2 and 8 are set to "2", while the weights of luminance are set to "2", [priority coefficient P2 and P8: 2×2] (step S51).

Further, the F-block (including the distance measuring points 3, 6 and 9), below the E-block, is considered to be very likely to include the principal subject, and so the weights of luminances of the distance measuring points 3, 6 and 9 are set to "6". On this basis, the positional weights of the distance measuring points 3 and 9 are set to "1", while the weights of the luminances are set to "6" [priority coefficient P6: 2×6] (step S53). Then, the processing proceeds to step S33 to determine the order of priority.

Further, when the F-block (3, 6, 9) is determined to the uppermost block in the step S12, this indicates that the camera is held for the vertically oblong picture composition, that is, the picture is composed of the uppermost F-block (3, 6, 9), middle E-block (2, 5, 8) and lowermost (D)-block (1, 4, 7), which is for a reverse picture composition to that described in steps S34 and S35.

Therefore, by substituting the settings of the priority coefficients of the D-block, E-block and F-block in the order given, applied in the case of the previously mentioned vertically oblong picture composition, for the settings of F-block, E-block and D-block respectively in the order given, the equal sequence can be made available only by changing the distance measuring points for the steps S35–S53 and the steps S54–S73.

In the case of such a vertically oblong picture composition, since the F-block is very likely to include the blank space (or sky), the average luminance BVu is obtained for use as the criterion for the discrimination (step S54). The average luminance BVu and the predetermined luminance BVs are compared (step S55); if the (average) luminance is higher than the predetermined luminance (in the case of YES), the priority coefficients P (P3, P6 and P9) of the distance measuring points 3, 6 and 9 are set to 1×1 respectively (step S56).

Further, in the case of this picture composition, the positional weights of the distance measuring points 1, 3, 7, 6 and 9 are set to "1", the same of 2, 4 and 8 to "2" and the same of 5 to "3".

In the above step S55, when the average luminance BVu is lower than the predetermined luminance BVs (in the case of NO), the priority coefficients of the distance measuring points 3, 6 and 9 are set to "1×2" (step S57).

Next, the weighting of the luminance for the E-block (2, 5, 8) (step S58–S67) follows the same sequence as that of the steps S28–S47 and is dependent on the results of the comparison of the luminances of the distance measuring points 2, 5 and 8 of the E-block and the average luminance BVu. In this comparison, if the luminance of the distance measuring point 2 is equal to (the average luminance), the weight of the luminance is set to [priority coefficient P2: 2×2] and to [priority coefficient P2: 2×6], if the luminance differs (steps S59–S61).

Further similarly, if the luminance of the distance measuring point 5 is equal to (the average luminance), (the weight of the luminance) is set to [priority coefficient P5: 3×2] and to [priority coefficient P5: 3×6], if differs (step S62–S64).

Further, if (the luminance of) the distance measuring point 8 is equal to (the average luminance), (the weight of the luminance) is set to [priority coefficient P8: 2×6] (step S65–S67).

Next, (the weights of the luminance of) the distance measuring points 1 and 7 are set to [priority coefficient P3 and P9: 1×3], and (the weight of the luminance of) the distance measuring point 4 is set to [priority coefficient P6: 2×3] (step S69).

On the other hand, when there is no difference in luminance among the distance measuring points 2, 5 and 8 in the E-block (in the case of NO), (the weight of the luminance of) the distance measuring point 5 is set to [priority coefficient P5: 3×2] (step S70), and (the weights of the luminance of) the distance measuring points 2 and 8 are set to [priority coefficients P2 and P8: 2×2] (step S71).

Further, the D-block (distance measuring points 1, 4 and 7), below the E-block, is considered to be very likely to include the principal subject, so that (the weights of the luminance of) of the distance measuring points 1 and 7 are set to [priority coefficients P1 and P7: 1×6] (step S72), and the (weight of the luminance of) the distance measuring point 4 is set to [priority coefficient P6: 2×6] (step S73). Then, the processing proceeds to step S33 to determine the order of priority.

As described in the foregoing, the number of distance measuring points, the measurement to which are required, can be reduced by analyzing the positions and distribution of the luminance within a given picture on the basis of the probability of the position of the principal subject of the picture.

Next, an explanation will be made as to the second embodiment of the present invention.

Similarly to the case of the previously described first embodiment, as shown in FIG. 14 and FIG. 15, the most appropriate distance measuring point may be selected according to the output of area sensor.

In the case of the picture composition shown in FIG. 14A, it is very likely that the principal subject exists in somewhere in the lower half of the picture area, since upper half of the picture area is know to be a blank space (sky). An automatic (principal subject) discrimination system can be made available by comparing two luminance sum distributions, one being obtained as the sum of the equal outputs from the light receiving elements, serving as area sensors, arranged to form a matrix to serve as a rectangular coordinates with x-axis and y-axis as shown in FIG. 14B so that the sum of the equal values on the y-axis in the direction of the x-axis can be graphically represented as the luminance sum distribution, the other being obtained as the sum of equal values on the x-axis in the direction of y-axis graphically represented as the luminance sum distribution as shown in FIG. 14C.

In the case of the picture shown in FIG. 14B, since the sky is separated from the ground, there is a large variation ΔBV of luminance; however, in the case of the picture shown in FIG. 14C, there is no clear-cut separation between the sky and the ground, causing a small luminance variation. The portion giving a large luminance variation is detected as yB.

Figure 15B:
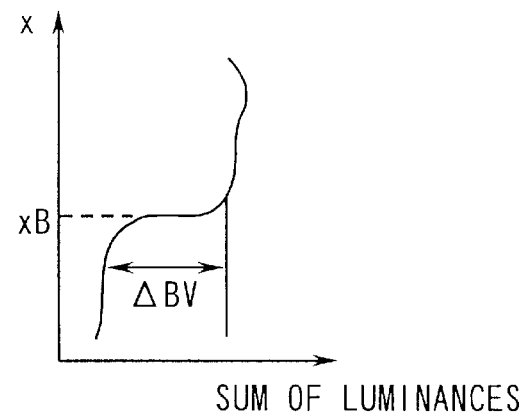
Figure 15C:
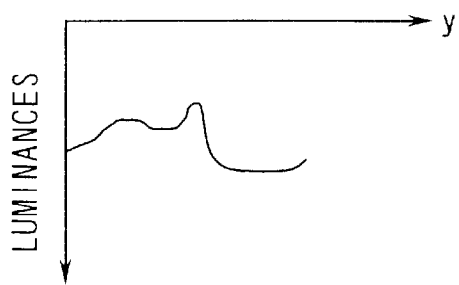

Further, in the case of the vertically oblong picture composition shown in FIG. 15A, in contrast, there is a large amount of variation (ΔBV) with respect to the luminance sum distribution in the direction of the y-axis; in the case of the picture shown in FIG. 15B, also there is a large amount of variation with respect to the luminance sum distribution in the direction of the x-axis, while in the case of the picture shown in FIG. 15C, there is only a small luminance sum distribution.

Figure 17:
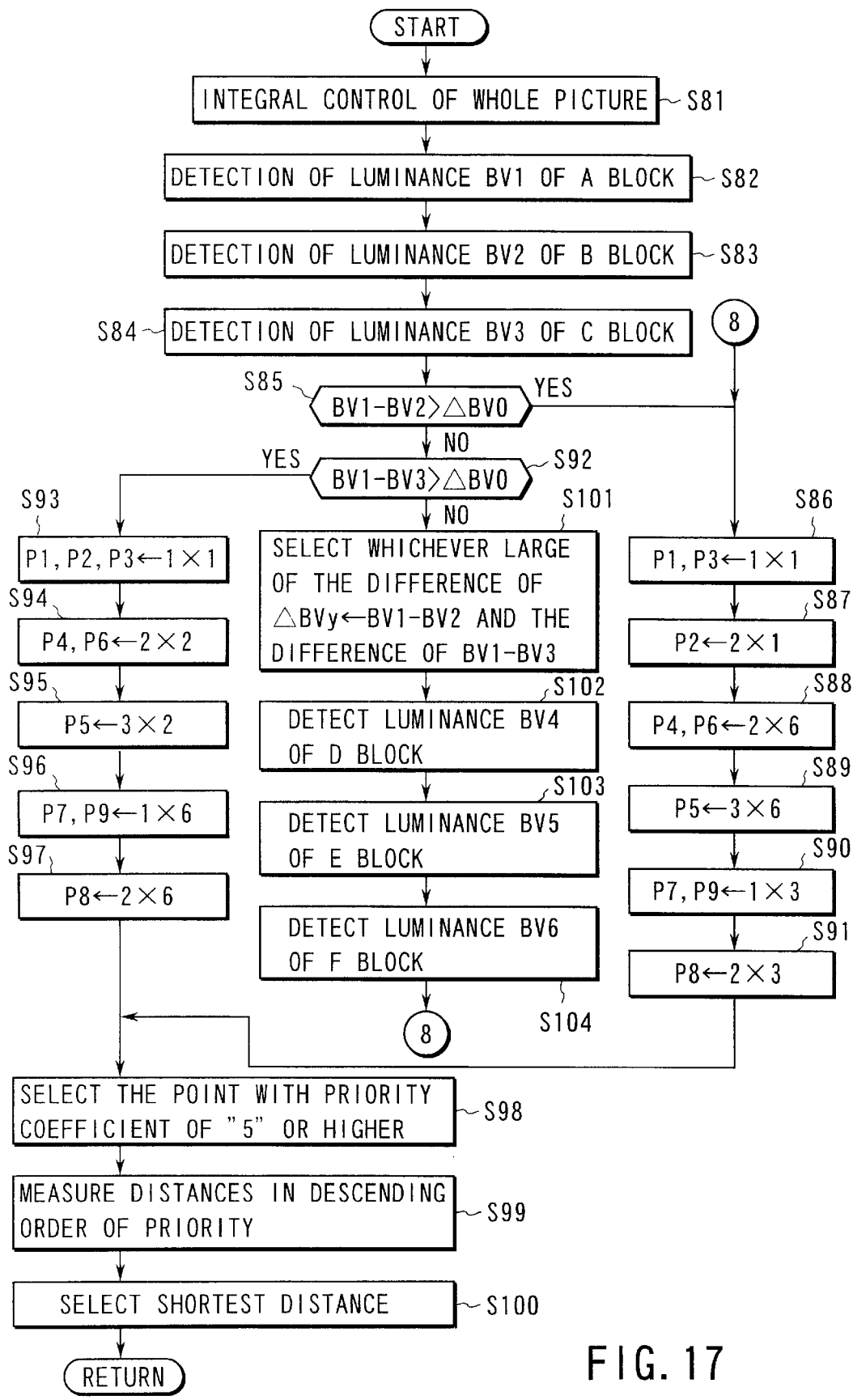
FIG. 17 shows a flow chart illustrating the selection by priority of the distance measuring points without using the vertical and horizontal detection mechanism.
Figure 18:
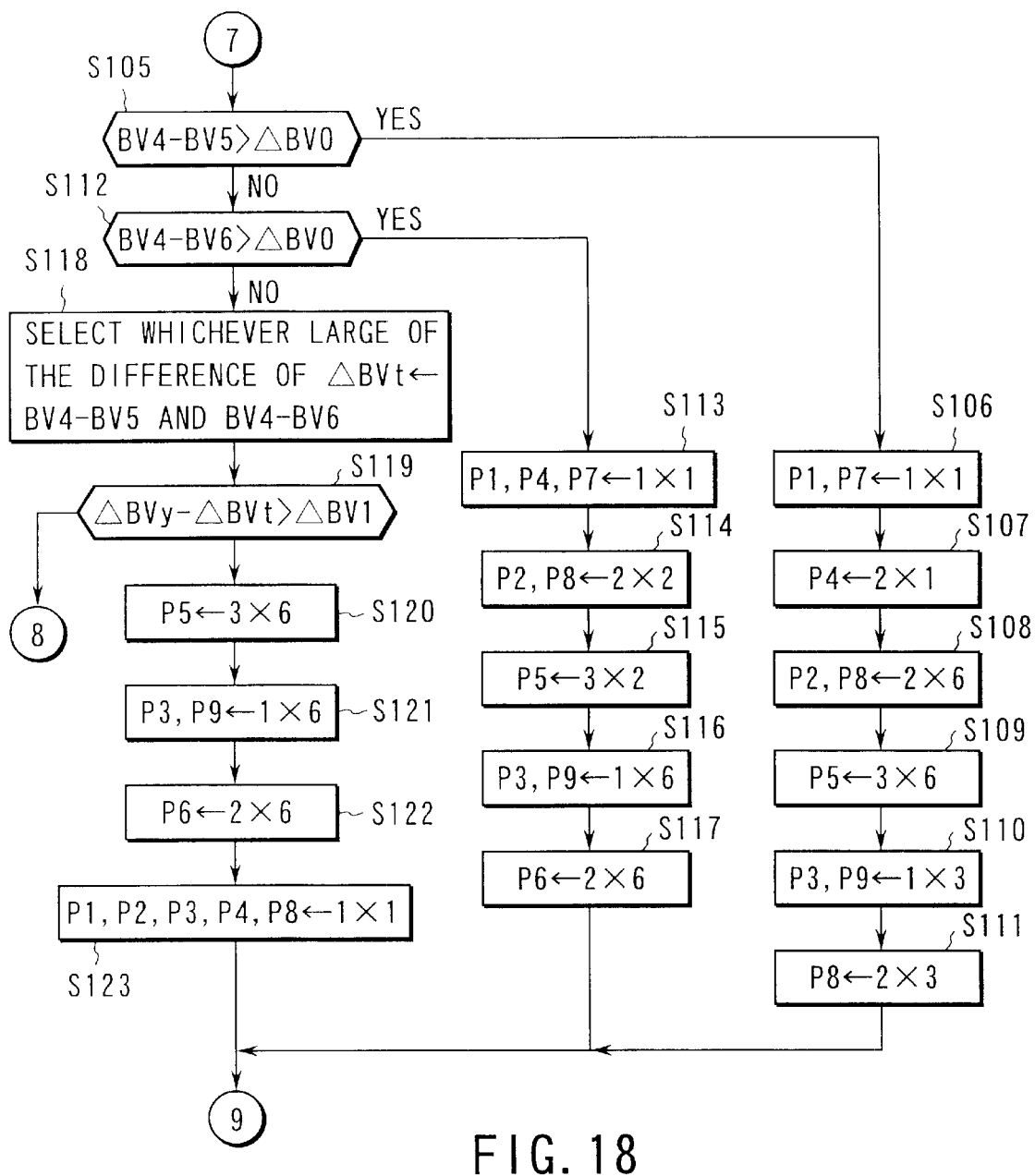
FIG. 18 is a flow chart for explaining the process for determining the priority (of the distance measuring point) following the flow chart of FIG. 17.

When the priority of the distance measuring point is selected according to the sequence of the flow charts as are shown in FIG. 17 and FIG. 18, the priority can be given to the areas of the picture not including the sky area.

Figure 16A:
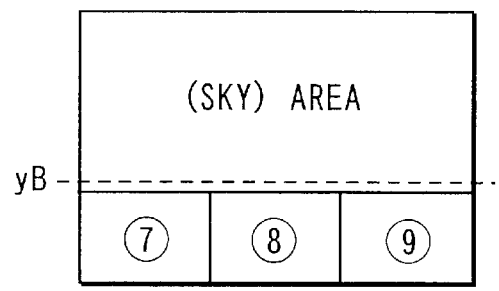
FIGS. 16A, 16B and 16C are diagrams illustrating the relationships between the distance measuring points and the spaces respectively.
Figure 16B:
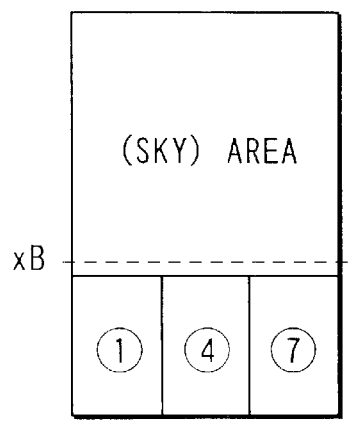
Figure 16C:
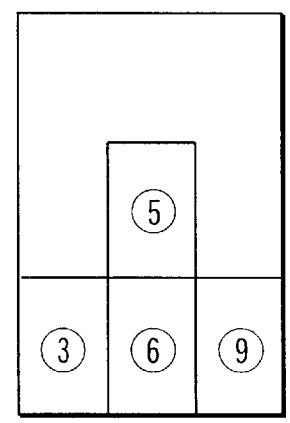

Further, when XB and YB cannot be detected, it is recommendable to give priority to the central area of the picture where the principal subject is very likely to exist as shown in FIG. 16C.

Further, in the case of the present embodiment, for the simplicity, explanation will be made as to the case where the picture to be taken is divided into 9 areas as is shown in FIG. 13A, but the number of division is not limited to this, and the division into any greater number can be made easily.

First, the integral control is executed in order to obtain the image signals for the distance measuring points throughout the whole area of the picture (step S81).

According to the result of the integration, the luminances of the distance measuring points 1, 2 and 3 within the A-block are added to obtain the sum BV1 of the luminances (step S82), and subsequently the luminances of the distance measuring points 4, 5 and 6 within the B-block and the luminances of the distance measuring points 7, 8 and 9 within the C-block are added respectively to obtain the luminance sums BV2 and BV3 respectively (steps S83 and S84).

Next, it is determined whether the difference between the sum BV1 and BV2 (BV1–BV2) is larger than ΔBVO or not (step S85). The difference between the luminance sums, as the result of the comparison, which is much larger than the predetermined difference BVO can be considered to indicate that the areas concerned are out of the sky area, suggesting the necessity of lowering the priority of the distance measuring point in the area above the sky area and the necessity of raising the priority of the distance measuring point in the area below the sky area.

In this process of determination, the difference of the luminance sums (BV1–BV2) is larger than the luminance difference BV0 (in the case of YES), only A-block can be considered to include the "sky" area, so that the weights of the distance measuring points 1, 2 and 3 are set to "1", the weights of the distance measuring points 4, 5 and 6 of the B-block to "6" and the weights of 7, 8 and 9 of the C-block to "3". Further, concerning the weighting by position, similarly to the case of the first embodiment, the weights of the distance measuring points 1, 3, 7 and 9, corresponding to the four corners of the picture, and the distance measuring point 2 at upper center of the picture are set to "1", the weights of the distance measuring points 4, 6 and 8 corresponding to the central area, not including those mentioned previously, to "2", and the weight of the distance measuring point 5 at the center of the picture to "3".

Accordingly, the distance measuring points 1 and 3 are set to [priority coefficient P1 and P3: 1×1] (step S86); the distance measuring point 2 is set to [priority coefficient P2: 2×1] (step S87); the distance measuring points 4 and 6 are set to [priority coefficient P4 and P6: 2×6] (step S88); the distance measuring point 5 is set to [priority coefficient P5: 3×6] (step S89); the distance measuring points 7 and 9 are set to [priority coefficient P7 and P9: 1×3] (step S90); the distance measuring point 8 is set to [priority coefficient P8: 8×2] (step S91). Then, the processing proceed to step S98, which will be described later.

On the other hand, concerning the determination made in the above step S85, when the difference of the sums (BV1–BV2) does not exceed the luminance difference BV0 (in the case of NO), it is determined whether the difference between the sum BV1 and the sum BV3 (BV1–BV3) is larger than the predetermined luminance difference ΔBV0 or not in the subsequent step (step S92). In this case, if it is determined that the difference between the sums of luminances (BV1–BV3) is larger than the luminance difference ΔBV0 (in the case of YES), this indicates that the B-block includes "sky" area, so that the lowest weight is given to the A-block.

Therefore, the weights of the distance measuring points 1, 2 and 3 are set to "1", the weights of the distance measuring points 4, 5 and 6 of the B-block to "2" and the weights of the distance measuring points 7, 8 and 9 of the C-block to "6". Further, concerning the weight by position, the rule similar to that of steps S86–S91 is applied.

On the basis described above, (the priorities of) the distance measuring points 1, 2 and 3 are set to [priority coefficients P1, P2 and P3: 1×1] (step S93); the distance measuring points 4 and 6 are set to [priority coefficients P4 and P6: 2×2] (step S94); the distance measuring point 5 to [priority coefficient P5: 3×2] (step S95); the distance measuring points 7 and 9 are set to [priority coefficients P7 and P9: 1×6] (step S96); the distance measuring point 8 is set to [priority coefficient P8: 2×6] (step S97).

Next, (the distance measuring points whose priority coefficients set according to the procedures described above are "5" or more) are selected (step S98). More particularly, this process is a step for selecting the distance measuring point in actually computing the distance to the distance measuring point by means of the correlation computation and interpolation computation, wherein the distance measuring points having the value of "5" or more are selected out of distance measuring points corresponding to P1–P9. Of course, "5" may be any value that is subject to change depending on the condition. In this case, the distance measuring points 5, 7, 9 and 8 are selected.

Of the selected distance measuring points, the distances thereto are measured in the order of the level of the priority, starting from one having the highest priority or highest priority coefficient (step S99). In this case, the correlation computation is not applied to the measurement of the distance which is not considered to be one relating to the principal subject in order to reduce the time lag, and the sequence of the steps for the measurement of the distance may be discontinued. In this case, the measurement of the distance will be made in the order of the distance measuring points 8→7 and 9→5. Then, of the results of the measurements of the distances, the shortest one is chosen as the distance at which the principal subject exists and on which the camera is to be focused, but the distance close to the predetermined distance may be chosen or may be specified as the distance for the focusing of the camera (step S100).

On the other hand, when the difference between the sums of the luminances (BV1–BV3) is determined to be not exceeding the luminance difference ΔBV0 (in the case of NO), the difference in the luminance (BV1–BV2) between the A-block and B-block is compared with the difference in luminance (BV1–BV3) between the A-block and B-block, and whichever larger is stored as the luminance difference data BVy (step S101). This luminance difference data is used for the re-discrimination of the vertically oblong picture composition and horizontally oblong picture composition.

From the result of the integration of the distance measuring points covering the whole area of the picture, the sum BV4, the sum of the luminances in the D-block (distance measuring points 1, 4 and 7), is obtained (step S102), and subsequently the sums BV5 and BV6, the sum of the luminances in the E-block (distance measuring points 2, 5 and 8) and the sum of the luminances in the F-block (distance measuring points 3, 6 and 9), are computed respectively (step S103 and step S104).

Next, the existence of the "sky" area is detected.

Similarly to the cases of the step S85 and the following steps, it is determined whether the difference between the sums of luminances (BV4–BV5) is greater than the predetermined luminance difference ΔBV0 or not (step S102). When the difference of the sums (BV4–BV5) is found to be greater than BV0 (in the case of YES), it is considered that only the D-block includes the "sky" area, and the weights of the distance measuring points 1, 4 and 7 are set to "1"; the weights of the distance measuring points 2, 5 and 8, to "3"; the weights of the distance measuring points 3, 6 and 9, to "3". Further, the weighting by the position is applied according to the rule applied to the previous cases.

Accordingly, the distance measuring points 1 and 7 are set to [priority coefficients P1 and P7: 1×1] (step S106); the distance measuring point 4 is set to [priority coefficient P4: 2×1] (step S107); the distance measuring points 2 and 8 are set to [priority coefficients P2 and P8: 2×6] (step S108); the distance measuring point 5 is set to [priority coefficient P5: 3×6] (step S109); the distance measuring points 3 and 9 are set to [priority coefficient P3 and P9: 1×3] (step S110); the distance measuring point 8 is set to [priority coefficient P8: 2×3] (step S111). Then, the processing proceeds to step S98.

However, in the above step S105, the difference between the sums (BV4−BV5) is not greater than BVO (in the case of NO), subsequently it is determined whether the difference between the sum BV4 and the sum BV6 (BV4−BV6) is greater than the predetermined luminance difference ΔBV0 or not (step S112). When it is determined that the difference between the sums (BV4−BV6) is greater than the luminance difference ΔBV0 (in the case of YES), the E-block includes "sky" area, and the lowest weight is assigned to the D-block.

Accordingly, the weights of the distance measuring points 1, 4 and 7 are set to "1"; the weights of the distance measuring points 2, 5 and 8 of the E-block, to "2"; the weights of the distance measuring points 3, 6 and 9 of the F-block, to "6" Further, the weighting by the position is made according to the rule applied to the previous cases.

Accordingly, the distance measuring points 1, 4 and 7 are set to [priority coefficients P1, P4 and P7: 1×1 (step S113); the distance measuring points 2 and 8 are set to [priority coefficients P2 and P8: 2×2] (step S114); the distance measuring point 5 is set to [priority coefficient P5: 3×2] (step S115); the distance measuring points 3 and 9 are set to [priority coefficients: P3 and P9: 1×6] (step S116); the distance measuring point 6 is set to [priority coefficient P6: 2×6] (step S117). Then, the processing goes back to the step S98.

Further, when the difference between the sums (BV4−BV6) is not greater than the luminance difference ΔBV0 (in the case of NO), the difference in luminance between the D-block and E-block (BV4−BV6) is compared with the difference in luminance between the D-block and F-block, and whichever larger is stored as the luminance difference data ΔBVt (step S118). This luminance difference data is later used for discriminating the vertically oblong picture composition and the horizontally oblong picture composition from each other.

Then, the difference between ΔBVy and ΔBVt (ΔBVy−ΔBVt) obtained in the above step S101 is compared with the predetermined luminance ΔBV1 to determined which of them is larger (step S119). When the difference (ΔBVy−ΔBVt) is greater than the predetermined luminance ΔBV1 (in the case of YES), the processing goes back to the step S86 due to the reason that the picture composition concerned is very likely to be a horizontally oblong picture composition.

However, if the difference (ΔBVy−ΔBVt) is not greater than the predetermined luminance ΔBV1 (in the case of NO), the weights of the distance measuring points 3, 5, 6 and 9 to "6", and the weights the distance measuring points 1, 2, 3, 4, 7 and 8 to "1"

Accordingly, the distance measuring point 5 is set to [priority coefficient P5: 3×6] (step S120); the distance measuring points 3 and 9 are set to [priority coefficient P3 and P9: 1×6] (step S121); the distance measuring point 6 to [priority coefficient P6: 2×6] (step S122); the distance measuring points 1, 2, 3, 4 and 8 to [priority coefficients P1, P2, P3, P4 and P8: 1×1] (step S123). Then, the processing goes back to the step S98.

As described in the foregoing, according to the present embodiment, the distance measuring apparatus is designed so that the measurement of the distance to the distance measuring point corresponding to the area where the principal subject hardly exist such as the area corresponding to the "sky" can be omitted, thereby making the vertical/horizontal direction detecting mechanism as is described previously.

In the cases of aforementioned first and second embodiments, the distribution of the positions and the distribution of the luminance within a picture area are analyzed to determine the order of the priority of distance measuring, so that the distance measuring points which are essential for actual distance measuring process are selected for reducing the time required for distance measuring, as well as for speeding the focusing process.

Figures 19A, 19B:
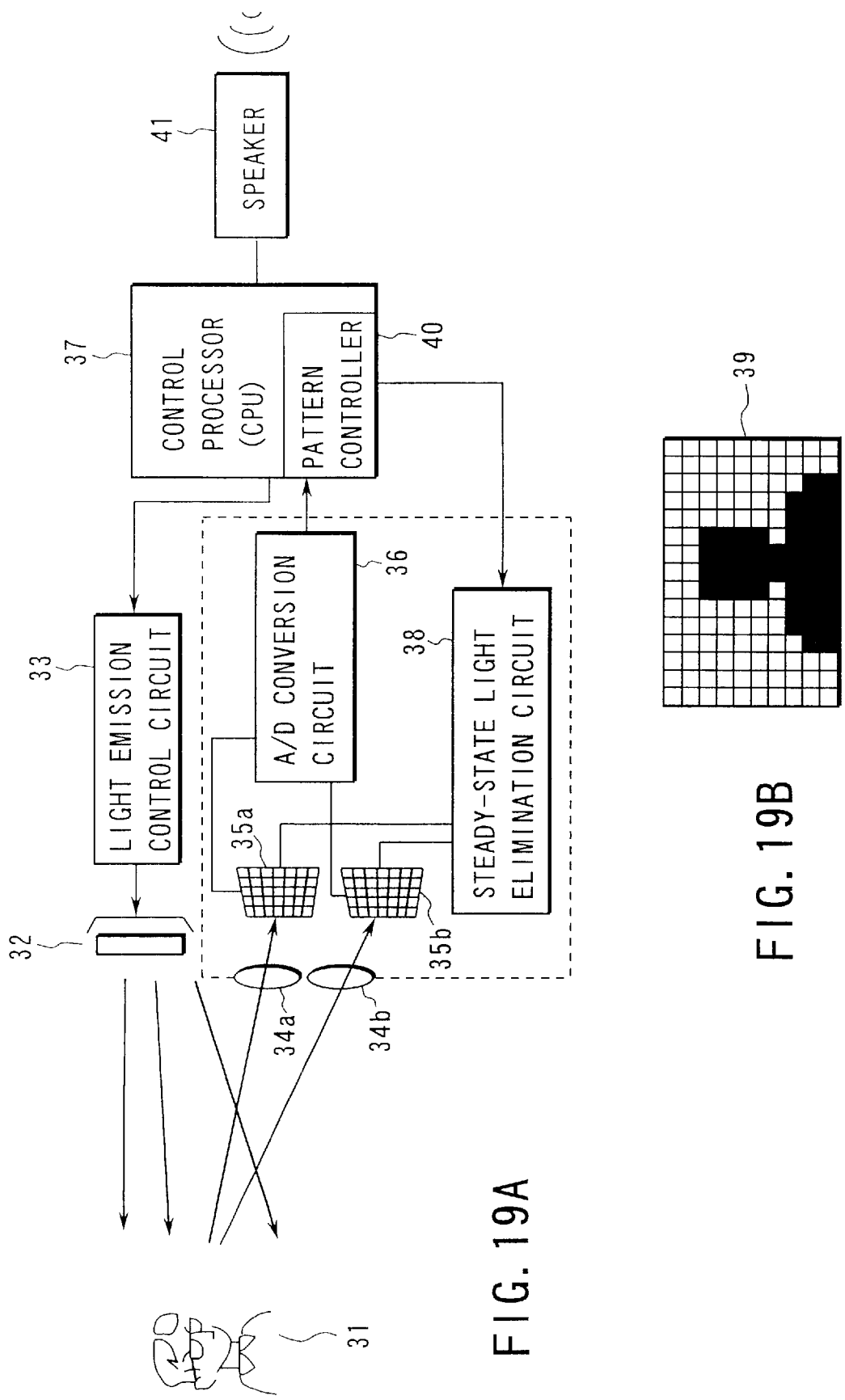
FIGS. 19A and 19B are schematic diagrams illustrating the composition of the distance measuring apparatus by the super combination FA according to the third embodiment.

Next, FIGS. 19A and 19B schematically shows the general composition of the distance measuring system based on the auto focus method called "the super-combination AF", and the explanation will be made as to the function of the camera mounted with this distance measuring apparatus.

FIG. 19A shows an example of the composition of the distance measuring apparatus for finding the distance to a subject 31 by emitting the light preceding to the flashlight.

First, through the control by the light emission control circuit 33, the auxiliary light is emitted form a stroboscopic lamp 32 to the subject so that the reflected signal light is received by two light receiving lenses 34a and 34b and received by two area sensors 35a and 35b.

These area sensors 35a and 35b respectively receive the image of the subject for photoelectric conversion, and the outputs therefrom are subjected to A/D conversion through A/D conversion circuit 36 so that the digital values of picture elements are input to a control processor (CPU) 37.

Further, the area sensors 35a and 35b are respectively connected to a steady-state light elimination circuit 38 so that the d-c-base signals of the light steadily incoming from the picture are eliminated, and only the pulsed light (auxiliary light) coming from the stroboscopic lamp 32 is obtained as output signal.

Thus, while the steady-state light elimination circuit is kept active, when the reflected signal light is received by the area sensors 35a and 35b, the image 39, represented by the black area in FIG. 19B, is focused on the light receiving surfaces thereof. The pattern of the image focused on the area sensor is analyzed by pattern controller 40 incorporated into the control processor 37; for example, when the pattern of the image is analyzed to be that of a person, such image can be interpreted to be the image of a person. The analysis of the image pattern is realized a software incorporated into pattern controller 40. Further, the control processor 37 is connected to a speaker 41 for announcing the information and the condition of the camera by patternized voice.

Figure 20:
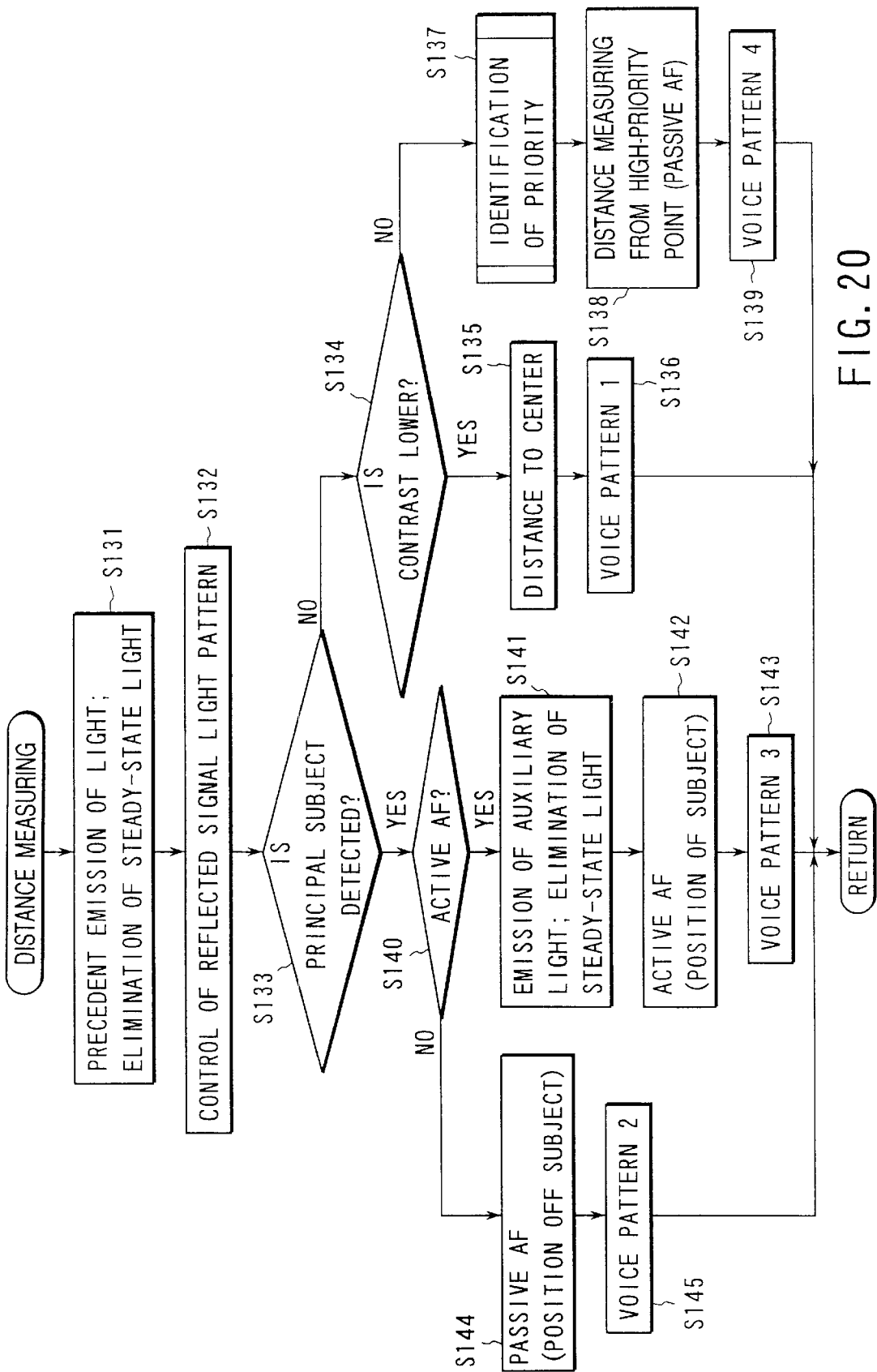
FIG. 20 is a flow chart illustrating the distance measuring process by the distance measuring apparatus according to the third embodiment.

The distance measuring process by the aforementioned distance measuring method will be explained referring to the flow chart given in FIG. 20.

First, prior to the executing the distance measuring process, the stroboscopic lamp 32 is made emit the precedent light, serving as the auxiliary light, to the subject 31, and the reflected light is transmitted to the area sensors 35a and 35b, thereby activating the steady-state light elimination circuit 38 to eliminate the steady-state light from the reflected signal light focused on the area sensors 35a and 35b to extract only the image signal component therefrom (step S131).

Then, the image signal, which has undergone the A/D conversion by the A/D conversion circuit 36A, is input to the control processor 37 to analyze the pattern of the image focused on the area sensors 35a and 35b by using the software (incorporated into the control processor 35a)(step S132). The image pattern is analyzed to determine whether it corresponds to the figure of a person as a principal subject of the picture (step S133). When the image pattern cannot be recognized as being that of the principal subject (in the case of NO), the luminance information or the like is added to the image pattern, and the contrast of the resulting image pattern is compared with that of the predetermined value to determine whether the former is higher than the latter or not (step S134). When it is determined that the contrast of the former is lower than that of the latter (in the case of YES), active method is selected, and the distances to the distance measuring points in the central area of the picture are measured mainly (step S135).

Then, the control processor 37 selects the announcement, "The position of the principal subject cannot be specified." or "The distances to the distance measuring points located in the central area of the picture will be measured." is selected from among the previously stored patterns of the announcement signal patterns to make a proper announcement vocally to the user of the camera through its speaker 41 according to the pronouncing pattern 1 (voice) (step S136). However, when it is determined, in the above step S134, that the contrast is higher than the predetermined value (in the case of NO), the order of the priority of the distance measuring point, which will be described later, is determined (step S137), and the distance measuring process is for the ranging finding points is executed in the order of priority thereof (step S138). The control processor 37 vocally announces, through the speaker 41, to the user of the camera the position of the principal subject, the priority of distance measuring points by using the announcement pattern (vocal) 4 selected out of the previously stored vocal announcement patterns (step S139).

On the other hand, when it is determined that the image pattern corresponds to the principal pattern in the above step S133 (in the case of YES), it is also determined whether the distance measuring process is to be executed by the active method or the passive method depending on the magnitude of the image signal (light signal) forming the image pattern and adequacy of the contrast (step S140).

When it is determined that an adequate contrast is not available by the image signal (light signal)(in the case of YES), the active method is selected (step S140). Therefore, the light for distance measuring is emitted again from the stroboscopic lamp to irradiate the subject 31, whereby the steady-state light elimination circuit 38 is activated to eliminate the steady-state light component from the reflected signal light focused on the area sensors 35a and 35b for extracting only the image signal component from the reflected signal light (step S141). Then, mainly, the distance to the position of the principal subject is measured by the active method by using the precedent emission of the light (step S142).

Then, the position of the principal subject is identified to measure the distance thereto by selecting the active method, and the result of the measurement is vocally announced to the user of the camera by the vocal pattern 3 (voice) through the speaker 41 (step S143), and the processing returns.

On the other hand, when it is determined, in the above step S140, that the image signal is weak (in the case of NO), the distance measuring process is executed by the passive method mainly according to the image signal corresponding to the principal subject whose position has already been identified (step S144).

Then, when the position of the principal subject is identified, and the active method is selected for measurement of the distance thereto, the announcement to the user of the camera is made through pronouncing device 409 by using the pronouncing pattern 2 (vocal) (step S145), the processing returns.

Therefore, according to the present embodiment, the control processor 1 selects the pronunciation pattern (vocal) depending on the distance measuring method and whether the principal subject is discriminated or not, so that the user of the camera can be readily informed of the photographing conditions or the like for adding to the confidence of the camera user in the photographing processes. In other words, according to the present embodiment, a camera having a reliable distance measuring apparatus characterized by the "super-combination AF is available to the camera users.

Further, the "super-combination AF" is named because of its not being a mere product of the hybridization of the active method and the passive method for the distance measuring process but also its being capable of detecting the principal subject by using these two method in combination.

Figure 21:
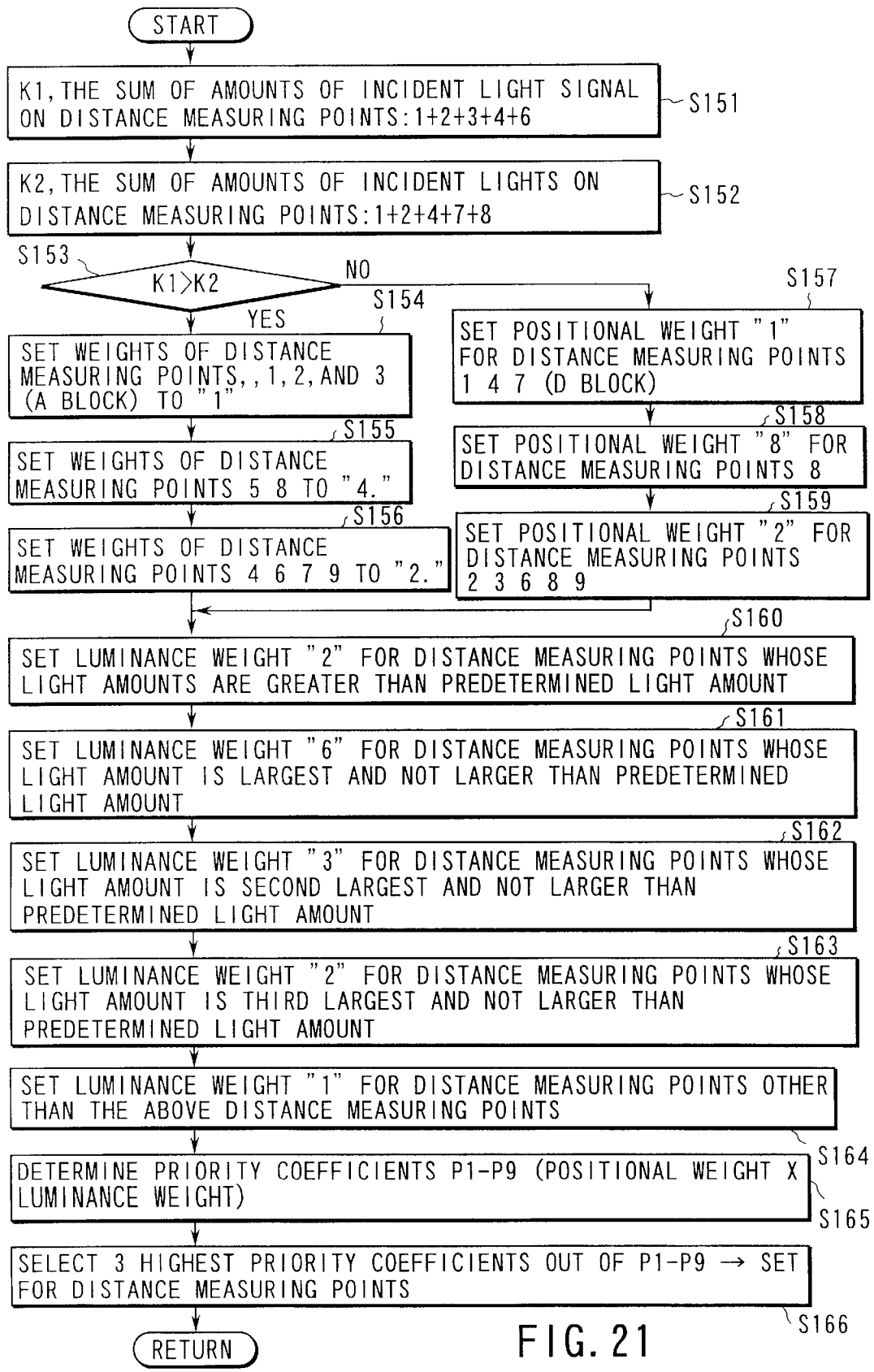
FIG. 21 is a flow chart illustrating the process for determining the priority of distance measuring process illustrated in FIG. 20.
Figure 25:
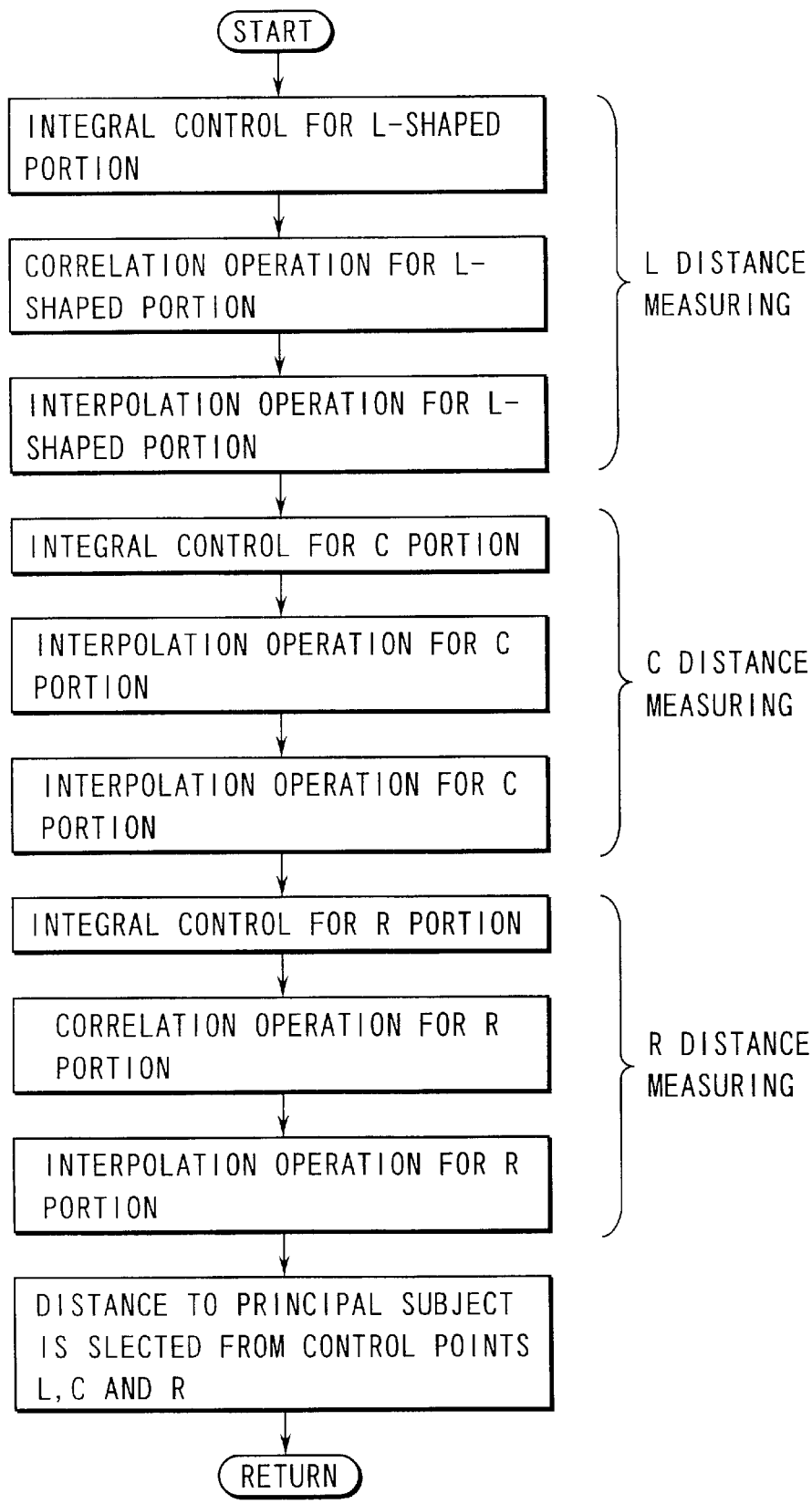
FIG. 25 is a flow chart explaining about the distances to the distance measuring points shown in FIGS. 24A and 24B.

Referring to the flow chart given in FIG. 21, the priority discrimination process of the distance measuring described for the step S137 will be explained in the following. The explanation will be made taking the example of the case where the picture is divided into 9 areas (distance measuring points 1–9) shown in FIG. 13A. Further, FIG. 22A shows an example of the horizontally oblong picture composition, while FIG. 22B shows an example of the vertically oblong picture composition.

First, the amounts of the reflected signal lights are compared to determine whether the picture is vertically oblong or horizontal oblong. That is, K1, the sum of the amounts of the reflected signal lights from the distance measuring points 1, 2, 3, 4 and 6) is found by computation (step S151), and K2, the sum of the amounts of the reflected signal lights from the distance measuring points 1, 2, 4, 7 and 8) is also found (step S152).

Then, the K2, the sum of the light amounts, is compared with the K1, the sum of the light amounts, to determine whether the former is larger than the latter (step S153). When the result of the comparison indicates that the K2, the sum of the light amounts, is larger than the K1, the sum of the light amounts, (in the case of YES), the picture composition can be considered to be horizontally oblong, and thus the distance measuring points 1, 2 and 3 are not considered to be likely to correspond to the principal subject but are likely to correspond to "sky" area. Thus, the weights of the distance measuring points 1, 2 and 3 are set to "1" (step S154). The distance measuring points 5 and 8 are very likely to correspond to the principal subject, so that their positional weights are set to "4" (step S155). Further, other distance measuring points 4, 6, 7 and 9 are assumed to be mediumly likely to correspond to the principal subject, so that their positional weights are set to "2" (step S156).

On the other hand, when it is determined, in step S152, that the K2, the sum of the amounts of lights, is less than K1, the sum of the light amounts, (in the case of NO), the picture composition is vertically oblong and thus the distance measuring points 1, 4 and 7 of the D-block are hardly likely to correspond to the principal subject and thus correspond to the "sky" area. Accordingly, the positional weights of the distance measuring points 1, 4 and 7 are set to "1" (step S157). The distance measuring point 5 is very likely to correspond to the principal subject, so that its positional weight is set to "8" (step S158). When the picture composition is vertically oblong, the picture is for the portrait of a person in many instances, and thus a greater (positional) weight is assigned to the distance measuring point 5 as being one corresponding to the central area of the picture. Further, other distance measuring points 2, 3, 6, 8 and 9 are assumed to be mediumly likely to correspond to the principal subject, and thus their positional weights are set to "2" (step S159).

After setting the positional weights of these distance measuring points, the weight of the luminance of the distance measuring point whose luminance is greater than the predetermined light amount is set to "2" (step S160).

This setting is designed for enabling the camera to be focused on the principal subject by assigning relatively low luminance weight to the bottle, table and so on in the foreground in the picture as in the case of the picture composition shown in FIG. 23A, thereby preventing the principal subject from being out of focus.

Next, in the above step 160, the luminance weight is set to "6" for the distance measuring point reflecting the largest amount of light selected from among the distance measuring points not including the those for which the low luminance weights have already been set (step S161). Then, the luminance weight is set to "3" for the distance measuring point having the second largest reflected light amount (step S162); the luminance weight is set to "2" for the distance measuring point having the third largest reflected light amount (step S163); the luminance weights are set to "1" for the remaining distance measuring points (step S164).

Next, the priority coefficient P, the product of the positional weight and the luminance weight, is determined in the descending order of the luminance level (step S165). Then, on the basis that higher the priority coefficient corresponds to higher priority, the distance measuring points, ranging one having the highest priority to the third highest priority, are selected for the measurement of the distances thereto (step S166).

For instance, in the case of the picture composition given in FIG. 23B, the distance measuring point corresponding to the forefront bottle is omitted, so that the distance measuring points 3, 5 and 6 will be selected. In this way, by measuring the distances to only the selected 3 distance measuring points while omitting the measurements for other distance measuring points, not only the time required for the distance measuring process beginning from the push of the shutter to the exposure to the light can be reduced but also the focusing of the camera can be made at higher accuracy.

As described previously, the correlation computation and the interpolation computation in the conventional distance measuring process by the passive method not only require complex process of computation that is apt to cause the time lag but also a large number of programs and the memory having a large capacity, but such problems of the conventional system can be reduced largely by employing the embodiment of the present invention, wherein the number of distance measuring points to be covered can be reduced to about 3 distance measuring points.

Thus, according to the present invention, the distance at which the principal subject is most likely to exist is selected for the focusing of the camera based on the result of the measurements with respect to the selected 3 distance measuring points; in this case, in order to produce a higher effect of the present invention, only the correlation computation is executed first to roughly determining the distribution of the distances, and the interpolation computation is executed after determining the distance measuring point on which the camera is to be focused.

As discussed in the foregoing, the present invention provides the multi-point distance measuring apparatus capable of carrying out the measurements with respect to a number of distance measuring points at low cost by using a commonly available one-chip microcomputer, and, on the other hand, discriminating the type of the picture composition prior to the execution of the distance measuring process so that the distance measuring point corresponding to the principal subject can be identified efficiently for enabling the camera to focus on the principal subject more quickly than the conventional distance measuring apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera with a multi-point distance measuring apparatus, designed for providing plural distance measuring points within a given picture area, said camera comprising:
    a position detector for outputting information concerning positions of the distance measuring points regarding a possible existence of a principal subject of a picture to be taken within a given picture area;
    a multi-point photometer for outputting information concerning luminance of incident light on the distance measuring points; and
    a priority determiner for determining priority of the distance measuring computation for the distance measuring points based on the information concerning the positions of the distance measuring points within the given picture area and the information concerning the luminance of the incident light on each distance measuring point, the priority determiner setting a higher priority for a distance measuring point at which a possibility of existence of the principal subject of the picture to be taken is higher and the luminance of the incident light meets a predetermined condition.

2. The camera according to the claim 1, further comprising a focusing device for setting the focus of the lens and a controller for controlling the focusing device, wherein the controller executes the distance measuring operation for each of the distance measuring points to control the focusing device according to the result of the distance measuring operation.

3. The camera according to claim 1, wherein the priority determiner includes a sampler for sampling a certain number of distance measuring points for which the distance measuring operation is to be executed.

4. The camera according to claim 3, which further comprises a focusing device for setting the focus of the lens and the controller for controlling the focusing device, and in which the controller executes the distance measuring operation for the distance measuring point sampled by the sampler and controls the focusing device according to the result of the distance measuring operation.

5. The camera according to claim 4, wherein the controller executes the distance measuring operation for each of the plural distance measuring points sampled by the sampler and selects a distance measuring point conforming to the predetermined condition from among the plural distance measuring points according to the result of the distance measuring operation and controls the focusing device for setting the focus of the lens on the (selected) distance measuring point.

6. The camera according to claim 1, wherein the position detector detects the distance measuring point located in the upper area of the picture composition.

7. The camera according to claim 6, wherein the detector includes a sensor for detecting whether the camera is held by the photographer for a vertically oblong picture composition.

8. The camera according to claim 1, wherein the position detector is designed to detect the distance measuring point locating at the position corresponding to the blank (sky) area in the defined picture composition.

9. The camera according to claim 1, wherein the position detector adds the outputs of the multi-point photometer (by horizontally covering the distance measuring points) and compares the sums of the luminances to detect the distance measuring point corresponding to the blank (sky) area of the picture.

10. The camera according to claim 1, wherein the position detector detects the distance measuring points not corresponding to the position of the principal subject in the picture.

11. The camera according to claim 10, which further comprises a light emitter for projecting the light for distance measuring to the subject, and in which the position detector detects the distance measuring points not corresponding to the position of the principal subject in the picture based on the output of the multi-point photometer corresponding to the reflected light from the principal subject.

12. The camera according to claim 1, wherein the priority determiner comprises a positional weight setter for outputting the weighted value for each of the distance measuring points according to the output of the position detector, a luminance weight setter for outputting the weighted luminance of each distance measuring point according to the output of the multi-point photometer and a priority coefficient computer for determining the priority coefficient based on the output of the positional weight setter and the output of the luminance weight setter.

13. A camera with a multi-point distance measuring apparatus designed for providing plural distance measuring points within a picture area, said camera comprising:
    a multi-point photometer for outputting information concerning incident light luminance of each distance measuring point; and
    a priority determiner for obtaining a sum of the outputs of the multi-point photometer measured in terms of each of two orthogonal axes of coordinates, comparing sums of the luminances and determining a priority of the distance measuring operation at each distance measuring point according to the result of the comparison of the sums of the luminances, the priority determiner lowering the priority for a distance measuring point at which a distance between the two sums of the luminances is at least a predetermined value.

14. A camera with a multi-point distance measuring apparatus designed for plural distance measuring points arranged in a matrix within a picture area, said camera comprising:
    a multi-point photometer for outputting information concerning incident light on each distance measuring point; and
    a priority determiner for obtaining a sum of the outputs of the multi-point photometer measured in terms of the matrix corresponding to each of two axes of coordinates, comparing the obtained sums, the sums of the luminances, and determining priority of the distance measuring operation for each distance measuring point according to the result of the comparison of the sums of the luminances, the priority determiner lowering the priority for a distance measuring point at which a distance between two luminance sums is large.

15. A camera with a multi-point distance measuring apparatus, comprising:
    a detector for detecting the distribution of the luminance within a picture;
    a distance measurer capable of measuring the distances to N number of points within a picture; and
    a priority computer for determining the priority in selecting M number (N>M) of points out the N number of points, based on a position of the points within the picture and an output from the detector, the priority computer setting a higher priority for a point at which a possibility of existence of the principal subject of the picture to be taken is higher and the luminance is at a predetermined level.

16. The camera according to claim 15, wherein the priority computer determines the priority in selecting the distance measuring point depending on the picture composition to be taken by the camera.

17. A distance measuring process for use in a camera with a multi-point distance measuring apparatus, comprising:
    an integration control step of obtaining the image data from two optical paths;
    a correlation operating step of comparing plural predetermined portions of the image data obtained through the two optical paths; and
    a determining step of selecting a possible area for focusing from among the predetermined plural areas based on information relating to luminance distribution according to the image data obtained by the integration control step and information relating to a principal object obtained by the correlation operating step.

18. The distance measuring process according to claim 17, further comprising an interpolation computation step of determining the degree of the agreement of the pitches of the picture elements within the possible area of the picture for focusing according to the result of the correlation computation step, and a focusing step of making the focusing of the camera according to the result of the interpolation computation step and the result of the determining step.

19. A camera with a multi-point distance measuring apparatus used for a camera, designed for measuring distances to plural points within a picture area in a predetermined order, said distance measuring apparatus comprising:
    position detection means for detecting a position of each point within the picture area;
    luminance distribution detection means for detecting luminance distribution of incident light within the picture area; and
    control means for determining an order of measurement of distance for each of the distance measuring points according to the position and the luminance distribution within the picture, the control means measuring the distance with a higher priority for a distance measuring point at which a possibility of existence of the principal subject of the picture to be taken is higher and the luminance meets a predetermined condition.

20. The distance measuring apparatus according to the claim 19, which further comprises a light emitter for projecting the light for detection to the subject, and in which the luminance distribution detection means receives the light reflected from the subject.

21. A camera with a multi-point distance measuring apparatus capable of covering plural distance measuring points within the picture, said camera comprising:

multi-point light measuring means for outputting incident light luminance information concerning each of the plural distance measuring points;

sampling means for sampling a certain number of distance measuring points for distance measuring operation according to position information of individual distance measuring points on the picture and the incident light luminance information at each of the plural distance measuring points, the sampling means sampling a distance measuring point at which a possibility of existence of a principal subject of the picture to be taken is higher and the luminance meets a predetermined condition; and focusing means for executing the distance measuring operation for only sampled plural distance measuring points to single out a distance measuring point conforming to the predetermined conditions from among the sampled distance measuring points and focus the photographing lens on the selected one distance measuring point.

22. A camera with a multi-point distance measuring apparatus according to claim 21, wherein the sampling means comprises a detector capable of detecting the directions of the sky and the ground in the picture and sampling a certain number of distance measuring points for which the distance measuring operation is to be executed in consideration of the detected directions of the sky and the ground.

* * * * *